United States Patent
Yamazaki

(10) Patent No.: US 6,205,145 B1
(45) Date of Patent: Mar. 20, 2001

(54) FIBRE CHANNEL FABRIC

(75) Inventor: Shigeo Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/017,208

(22) Filed: Feb. 2, 1998

(30) Foreign Application Priority Data

Jan. 31, 1997 (JP) .................................................. 9-033209

(51) Int. Cl.⁷ .................................................. H04L 12/56

(52) U.S. Cl. .......................... 370/395; 370/229; 370/232; 370/389; 359/115; 359/118

(58) Field of Search .................................. 370/389, 392, 370/395, 396, 470, 471, 474, 221, 232, 235, 229, 360, 362, 363, 465, 466, 468, 412, 413, 414, 415, 417; 359/115, 118

(56) References Cited

U.S. PATENT DOCUMENTS

| 4,577,308 | 3/1986 | Larson et al. | 370/9 |
| 4,734,907 | 3/1988 | Turner | 370/60 |

(List continued on next page.)

FOREIGN PATENT DOCUMENTS

| 0 697 801 | 2/1996 | (EP) . |
| 61-501814 | 8/1986 | (JP) . |

(List continued on next page.)

OTHER PUBLICATIONS

Ancor Communications, Inc., "The World's Fastest Networks", Jun. 17, 1996, 1/1 and 1/9–9/9.

Ohno, et al., "ACK Control of a Fibre Channel/ATM Converter", Proceedings of the General Meeting at the Institute of Electronics, Info. & Comm., Mar. 28–31 1996, p. 205.

Anezaki, et al., "A Study for Configuration of a Fibre Channel/ATM Converter", Proceedings of the Gen'l Mtg at the Insti. Of Elec., Info. & Comm., Mar. 28–31 1996, p. 206.

Ohno, et al., "Study of a Signal Speed Conversion Buffer for . . . Converter", Proceedings of the Gen'l Mtg at the Insti. Of Elec., Info. & Comm., Mar. 28/31 1996, p. 207.

Komatsu, et al., "A Study on a Switching system in the Gigabit Network", Proceedings of the Gen'l Mtg at the Insti. Of Elec., Info. & Comm., Mar. 28–31 1996, p. 274.

K. Miyahara, et al., "A Study of Protocol Structures for Fibre . . . Conversion", Proceedings of the Gen'l Mt. at the Insti. Of Elec., Info. & Comm., Mar. 27–30 1995, p. 201.

\* cited by examiner

Primary Examiner—Seema S. Rao
Assistant Examiner—Saba Tsegaye
(74) Attorney, Agent, or Firm—Foley & Lardner

(57) ABSTRACT

There is provided a fiber channel fabric for interchanging frame by dividing a connectionless, variable length frame into fixed length cells without carrying out calling setup and/or releasing command between termination nodes, to thereby interchange cells, and further by reconstructing the thus interchanged cells into an original frame, the fiber channel fabric including (a) a fiber channel interface controller for communicating with a termination node or another fiber channel fabric to control a fiber channel in protocol, (b) an input data buffer for temporarily storing a frame received the termination node or the another fiber channel fabric, (c) a cell producer for dividing the frame received into fixed length cells, (d) a cell switch for interchanging data at the unit of a fixed length cell, (e) a frame constructor for reconstructing an original frame of the fixed length cells transmitted from the cell switch, (f) an output data buffer for temporarily storing a frame transmitted from the frame constructor, and (g) a congestion controller for monitoring a load of the cell switch to thereby avoid congestion. The above-mentioned fiber channel fabric can be readily constructed as a hardware for enhancing interchangability, and provides a congestion controller having a simpler structure.

30 Claims, 15 Drawing Sheets

U.S. PATENT DOCUMENTS

| | | | | |
|---|---|---|---|---|
| 4,829,227 | | 5/1989 | Turner | 370/60 |
| 5,315,588 | | 5/1994 | Kajiwara et al. | 370/60.1 |
| 5,412,484 | | 5/1995 | Yoshikawa | 358/433 |
| 5,557,610 | | 9/1996 | Calamvokis et al. | 370/60.1 |
| 5,610,918 | * | 3/1997 | Kamo et al. | 370/395 |
| 5,689,501 | * | 11/1997 | Takase et al. | 370/244 |
| 5,757,775 | * | 5/1998 | Yokoyama et al. | 370/242 |
| 5,790,522 | * | 8/1998 | Fichou et al. | 370/236 |
| 5,828,475 | * | 10/1998 | Bennett et al. | 359/139 |
| 5,872,822 | * | 2/1999 | Bennett | 375/372 |
| 5,894,481 | * | 4/1999 | Book | 370/412 |
| 6,002,692 | * | 12/1999 | Wills | 370/465 |

FOREIGN PATENT DOCUMENTS

| | | |
|---|---|---|
| 62-155648 | 7/1987 | (JP) . |
| 4-291548 | 10/1992 | (JP) . |
| 5-268255 | 10/1993 | (JP) . |
| 6-45944 | 2/1994 | (JP) . |
| 6-335038 | 12/1994 | (JP) . |
| 6-350651 | 12/1994 | (JP) . |
| 7-202903 | 8/1995 | (JP) . |
| 7-321824 | 12/1995 | (JP) . |
| 8-251195 | 9/1996 | (JP) . |
| 9-116561 | 5/1997 | (JP) . |
| 9-121211 | 5/1997 | (JP) . |
| 9-121212 | 5/1997 | (JP) . |
| 9-121213 | 5/1997 | (JP) . |
| 9-238145 | 9/1997 | (JP) . |
| 9-326829 | 12/1997 | (JP) . |
| 10-145431 | 5/1998 | (JP) . |

| NID | ADDRESS HEADER |
|---|---|
| 0 | 0(10) |
| 1 | 1(10) |
| 2 | 2(10) |
| 3 | 3(10) |

| NID | ADDRESS HEADER |
|---|---|
| 0 | 0001(10) |
| 1 | 0010(10) |
| 2 | 0100(10) |
| 3 | 1000(10) |

FIG. 18A

| FID | ADDRESS HEADER |
|---|---|
| 1 | 2 |
| 2 | 3 |

FIG. 18B

| FID | ADDRESS HEADER |
|---|---|
| 0 | 0 |
| 2 | 3 |

FIG. 18C

| FID | ADDRESS HEADER |
|---|---|
| 0 | 0 |
| 1 | 1 |

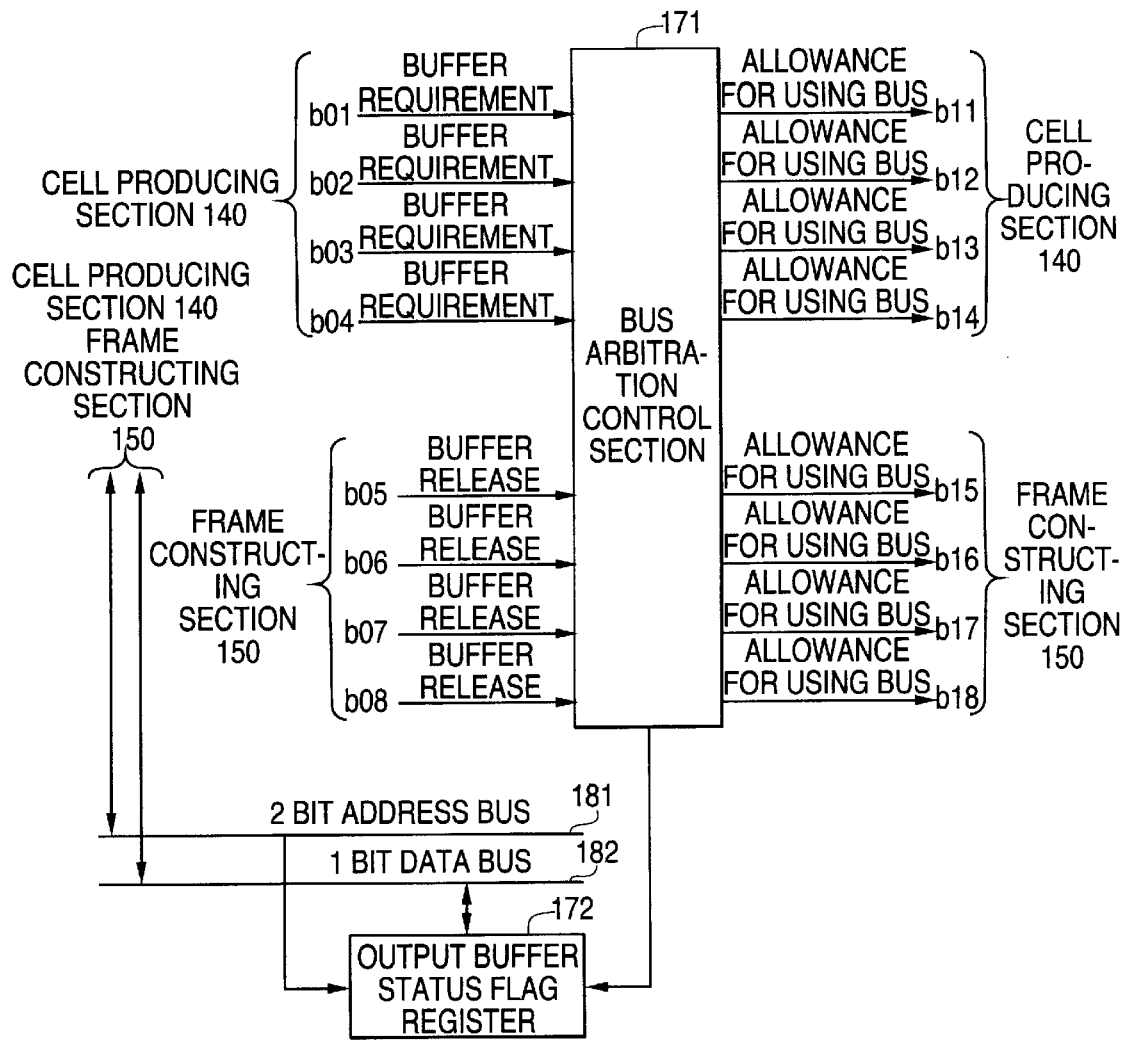

FIBRE CHANNEL FABRIC

BACKGROUND OF THE INVENTION

1. Field of the Invention

The invention relates to a fabric for a fibre channel which is one of data communication standards standardized as X3T11 by American National Standard for Information Systems (ANSI), and more particularly to a fibre channel fabric which is capable of higher speed operation and the greater number of nodes.

2. Description of the Related Art

A fibre channel, which is one of data communication standards standardized by ANSI as an I/O channel of computer system or communication medium for local area network (LAN), is characterized by making data communication at the unit of a variable length frame having 2148 bytes at maximum including header and other control data, having various flow control functions and a calling control function which is called class service, and being able to construct flexible communication system in line with various applications.

For instance, Ancor Communications-The World's Fastest Network, a version updated on Jun. 17, 1996, shows three topologies as illustrated in FIGS. 1, 2, and 3. Those three topologies are ones standardized as a fibre channel: a fabric type illustrated in FIG. 1; a point-to-point type illustrated in FIG. 2; and a loop type illustrated in FIG. 3. A fibre channel fabric acts as a data communication equipment which constitutes fabric topology of the above-mentioned fibre channels. Nodes which play a main role in data communication are connected to a fibre channel fabric in star-like arrangement.

A conventional fibre channel fabric interchanges a variable length frame as it is, namely, without converting a variable length frame into other forms, resulting in that a control thereof was unavoidable to be quite complicated, and that it was quite difficult or almost impossible to increase the number of nodes connecting thereto, and enhance interchangability thereof.

For instance, Japanese Unexamined Patent Publication No. 5-268255 has suggested a solution to a frame relay exchange system having the same problems as mentioned above. The Publication suggests dividing a variable length frame relay packet into fixed length ATM (Asynchronous Transfer Mode) cells, to thereby exchange cells for enhancement of interchangability. However, ATM characteristics make it difficult to avoid cell loss caused by congestion. In order to this problem, Japanese Unexamined Patent Publication No. 7-202903 has suggested a system where a frame relay packet is converted into cells by utilizing cell loss priority control identifier for ATM.

However, since calling setup is basically connection-oriented in a frame relay, a frame relay has high affinity with ATM. Accordingly, it is expected that the above-mentioned Publications can enhance interchangability, but the above-mentioned prior art is not applicable to a fibre channel, as mentioned below.

That is, a fibre channel has connection-oriented calling setup, which is called "class 1 service" in the fibre channel standard, and a connectionless calling setup, which is called "class 2 or 3 service" in the fibre channel standard. If the above-mentioned prior art were applied to the connectionless calling setup, a fabric would have to carry out ATM calling setup/releasing command each time when a communication of one frame of a fibre channel is made.

FIG. 4 illustrates a calling setup/releasing command sequence for B-ISDN (Broadband aspects of ISDN) which is typical communication network utilizing ATM and is recommended as Q.2931 by ITU-T (International Telecommunication Union-Telecommunication Standardization Sector).

With reference to FIG. 4, in a system where ATM calling setup and releasing command are carried out each time before and after one frame having about 2000 bytes at maximum is interchanged, an overhead required for calling setup/releasing command is too excessive, resulting in reduction in performance greater than enhancement in interchangability brought by data communication utilizing fixed length cells. Accordingly, a fibre channel fabric needs to have a calling setup system which is capable of high speed operation and being constructed in simpler configuration, and which is not dependent on ATM calling setup system.

For the same reason, the above-mentioned prior art which attempts to avoid cell loss by virtue of ATM congestion control function is not applicable to a fibre channel fabric.

As having been mentioned so far, since the prior art fibre channel fabric interchanges a variable length frame as it is, namely without converting into other forms, the prior art fibre channel fabric is accompanied with problems that the control therefor is quite complicated, and that it is quite difficult or almost impossible to increase the number of nodes to be connected to the fibre channel fabric, and enhance interchangability thereof.

In addition, when a technique for enhancement in performance of a frame relay interchange system is to be applied to a fibre channel fabric, problems arise as follows.

First, a conventional system where a variable length data is interchanged by dividing into fixed length cells such as ATM has a problem that when a system for interchanging original variable length data is a connectionless one, an overhead concerned with calling setup is quite great, and hence interchangability is deteriorated to much degree. The reason is as follows. If original variable length data is connection-oriented, it would be possible to cause a time necessary for ATM calling setup to be contained in a time necessary for calling setup of the original variable length data, and it would be also possible to carry out data exchange after calling setup at higher speed by virtue of conversion into fixed length cells. On the other hand, in a system where calling setup is made frame by frame to a connectionless, variable length frame, a time necessary for calling setup is added to exchange time as an increase.

Secondly, the congestion control system suggested in a system where a frame relay packet is converted into cells requests a cell to be produced in accordance with ATM standards. Hence, if a cell were to be produced not in accordance with ATM standards, it was necessary to have another congestion control system in place of the above-mentioned one. The reason is that partial cell loss caused by congestion results that original variable length frame is unable to be reconstructed after cell exchanges, regardless of whether data is connection-oriented or not, and hence it is absolutely necessary to have any means for avoiding cell loss or means for detection and recovery.

Japanese Unexamined Patent Publication No. 62-155648, based on U.S. patent application Ser. No. 773,380 filed on Sep. 6, 1985 by Jonathan Seals Turner and assigned to Washington University, has suggested a packet switch apparatus, and a method of distributing a copy of data packet to a plurality of addresses.

Japanese Unexamined Patent Publication No. 7-321824, based on U.K. patent application No. 94303118.7 filed on Apr. 28, 1994 by Hewlett Packard Company, has suggested a chip used for cell switch fabric. The Publication suggests an integrated circuit chip which is applicable to cell switch fabrics having various structures and which is capable of interfacing a cell memory with N input and output ports.

Japanese Unexamined Patent Publication No. 6-335038, based on U.S. patent application Ser. No. 58,185 filed on May 10, 1993 by Lawrence Baranye and assigned to American Telephone and Telegraph Company, has suggested a method of replacing interchange fabrics in a data communication equipment.

Japanese Unexamined Patent Publication No. 61-501814, based on U.S. patent application Ser. No. 597,508 (PCT/US85/00557) filed on Apr. 6, 1984 by Royal M. Larthon et al. and assigned to American Telephone and Telegraph Company, has suggested multiplexed interconnection in packet interchange node package.

Japanese Unexamined Patent Publication No. 6-350651 has suggested hybrid type data processing apparatus which can process a packet signal, a frame relay signal, and ATM cell.

Japanese Unexamined Patent Publication No. 6-45944 has suggested an apparatus for encoding and decoding variable rate, which is capable of keeping quality in encoding and decoding data even if input data varies in an amount.

Japanese Unexamined Patent Publication No. 4-291548 has suggested a matrix type time sharing label interchange system where variable length and fixed length frames are contained in a common interchange device to thereby carry out uniform interchange.

SUMMARY OF THE INVENTION

In view of the above-mentioned problems of the prior art, it is an object of the present invention to provide a fibre channel fabric, acting as a variable length frame interchange equipment having connectionless interchange system in a fibre channel, which can be readily constructed as a hardware.

Another object of the present invention is to provide a fibre channel fabric, acting as a variable length frame interchange equipment utilizing fixed length cell conversion system such as ATM, which provides a simply structured congestion control.

There is provided a fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, the fibre channel fabric including (a) a fibre channel interface controller for communicating with a termination node or another fibre channel fabric to control a fibre channel in protocol, (b) an input data buffer for temporarily storing a frame received the termination node or the another fibre channel fabric, (c) a cell producer for dividing the thus received frame into fixed length cells, (d) a cell switch for interchanging data at the unit of a fixed length cell, (e) a frame constructor for reconstructing an original frame of the fixed length cells transmitted from the cell switch, (f) an output data buffer for temporarily storing a frame transmitted from the frame constructor, and (g) a congestion controller for monitoring a load exerted on the cell switch to thereby avoid congestion.

It is preferable that the cell producer includes (a) an address header producer for converting address data contained in a frame of a fibre channel into internal address data required for the cell switch to carry out cell interchanges, (b) a cell numeral producer for producing sequence numerals for cells, which are necessary for detecting cell loss, (c) a frame division controller for adding both an address header produced by the address header producer and the cell sequence numeral produced by the cell numeral producer into a fragment of a frame taken out of the input data buffer to thereby produce a fixed length cell, and transferring the thus produced fixed length cell to the cell switch, and (d) an output buffer requiring device for cooperating with the congestion controller to manage operation status of the output data buffer, and control operation timing of the frame division controller so that a load over a predetermined magnitude is not exerted on the cell switch.

It is also preferable that the address header producer includes (a) an address identifier storing device for storing an address identifier of an input frame, and (b) an address converter for receiving an output transmitted from the address identifier storing device, and transmitting an internal address identifier in a fabric to the cell switch. The address header producer may be designed to include (a) address identifier storing device for storing an address identifier of an input frame, (b) a comparator for comparing an output transmitted from the address identifier storing device with an address identifier transmitted to the fibre channel, (c) a first address converter for receiving a part of an output transmitted from the address identifier storing device, and transmitting an internal address identifier in a fabric to the cell switch, (d) a second address converter for receiving another part of an output transmitted from the address identifier storing device, and transmitting an internal address identifier in a fabric to the cell switch, and (e) a selector for selecting and transmitting one of outputs transmitted from the first and second address converter in accordance with a result of comparison carried out by the comparator.

The fibre channel fabric may further include an address header register for storing data read out of the address converter, the data making an address header.

It is preferable that the frame constructor includes (a) a cell header remover for removing cell control data including an address header out of a cell transferred from the cell switch to thereby extract a fragment of a frame of a fibre channel, and transmitting the thus extracted fragment to the output data buffer, and (b) a cell numeral monitor for detecting whether cell loss occurs by monitoring an order of cells received from the cell switch.

The fibre channel fabric may further include an address header register for storing the one of outputs transmitted from the first and second address converters.

It is preferable that the frame constructor includes (a) a cell header remover for removing cell control data including an address header out of a cell transferred from the cell switch to thereby extract a fragment of a frame of a fibre channel, and transmitting the thus extracted fragment to the output data buffer, and (b) a cell numeral monitor for detecting whether cell loss occurs by monitoring an order of cells received from the cell switch by virtue of the cell sequence numeral contained in a cell.

It is preferable that the congestion controller includes (a) a flag register having the bit number equal to the number of I/O ports, and (b) a bus arbitrating and controlling device for receiving access requirements transmitted from the cell producer and the frame constructor to the flag register, arbitrating the access requirements and transmitting arbitration results to a requester, and controlling address/data bus through which the cell producer and the frame constructor are communicated with the flag register, in accordance with the arbitration results, to thereby control writing to and reading out of the flag register.

For instance, the input data buffer may be designed to have a function of absorbing a difference between a communication rate of a fibre channel and a cell interchange rate in the cell switch. The frame constructor may be designed to, when receiving a final cell constituting a frame, extract data necessary for a fibre channel frame out of effective data contained in control data of the final cell.

The output data buffer may be designed to have a function of absorbing a difference between a communication rate of a fibre channel and a cell interchange rate in the cell switch.

For instance, the cell numeral producer may be designed to include (a) a port identifier register for retaining a port number of a fibre channel, and (b) a counter countable up to a predetermined number, the counter being initialized prior to frame division accomplished by the frame division controller. The counter may be incremented each time when a cell is transferred, and apply the thus obtained number to the cell as a cell numeral.

For instance, the address converter, the first and second address converters may be constituted of a static random access memory (SRAM).

The fibre channel fabric in accordance with the present invention accomplishes calling setup/releasing command and congestion control frame by frame in simple structure, which are not dependent on ATM standards. Hence, it is now possible to constitute a connectionless, variable length frame type data communication equipment of a fixed length cell interchange device such as ATM switch device.

An interchange system using a fixed length cell is more readily constructed as a hardware than an interchange system using a variable length frame, and can be constructed in a hardware having a simpler structure. Hence, the interchangability of the fixed length cell interchange system can be readily enhanced.

The interchangability Q of a whole fibre channel fabric is represented with the following equation.

$$Q = \text{(data transfer rate per one I/O port)} \times \text{(the number of I/O ports)}$$

Hence, enhancement in the interchangability means an increase in the number of I/O ports having the same data transfer rate.

Thus, the present invention provides enhancement in interchangability of a fibre channel fabric, and an increase in the number of nodes to be connected thereto.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 18A illustrates an example of a conversion table arranged in the second address header conversion table.

FIG. 18B illustrates another example of a conversion table arranged in the second address header conversion table.

FIG. 18C illustrates still another example of a conversion table arranged in the second address header conversion table.

FIG. 20 is a block diagram of an output buffer status flag controller in the another preferred embodiment of the present invention.

FIG. 21 illustrates an example of an output buffer status flag register illustrated in FIG. 20.

DESCRIPTION OF THE PREFERRED EMBODIMENTS

Figure 1:
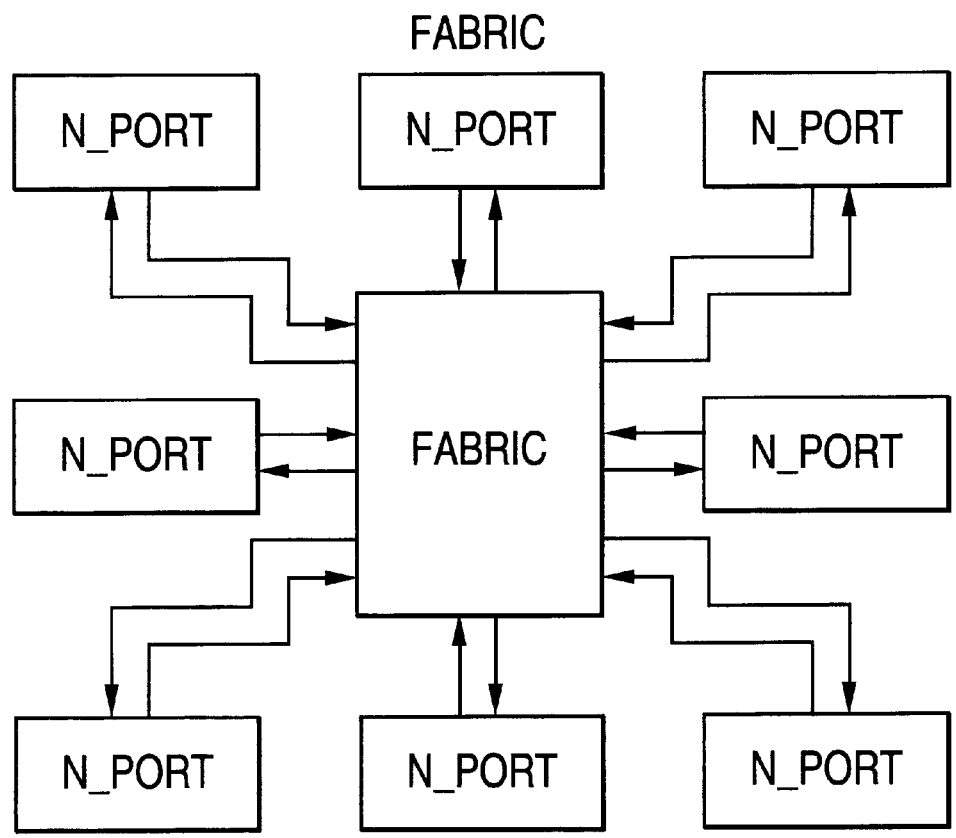
FIG. 1 is a block diagram illustrating a topology of a fabric type fibre channel.
Figure 2:
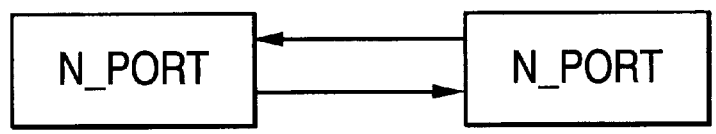
FIG. 2 is a block diagram illustrating a topology of a point-to-point type fibre channel.
Figure 3:
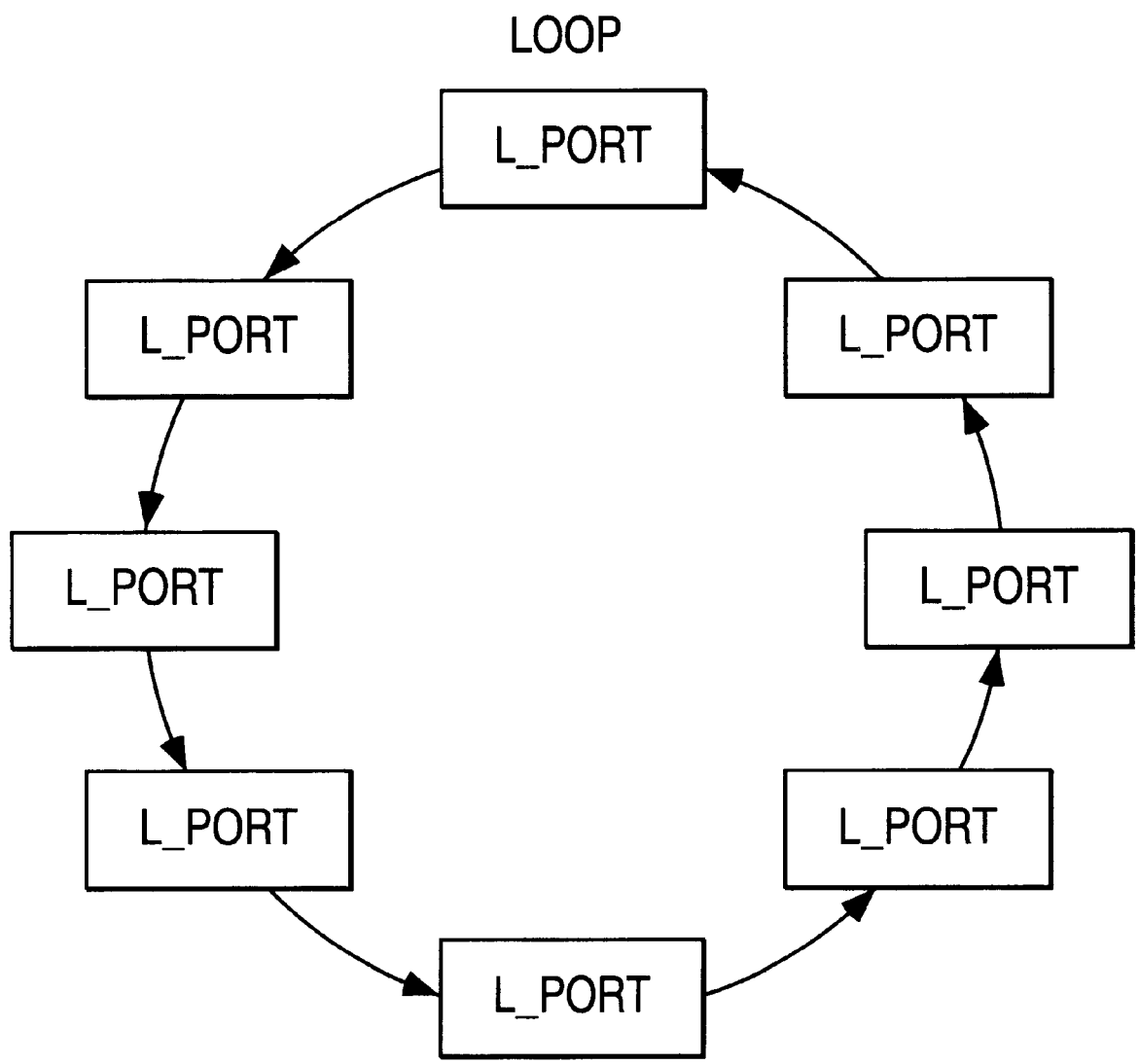
FIG. 3 is a block diagram illustrating a topology of a loop type fibre channel.
Figure 4:
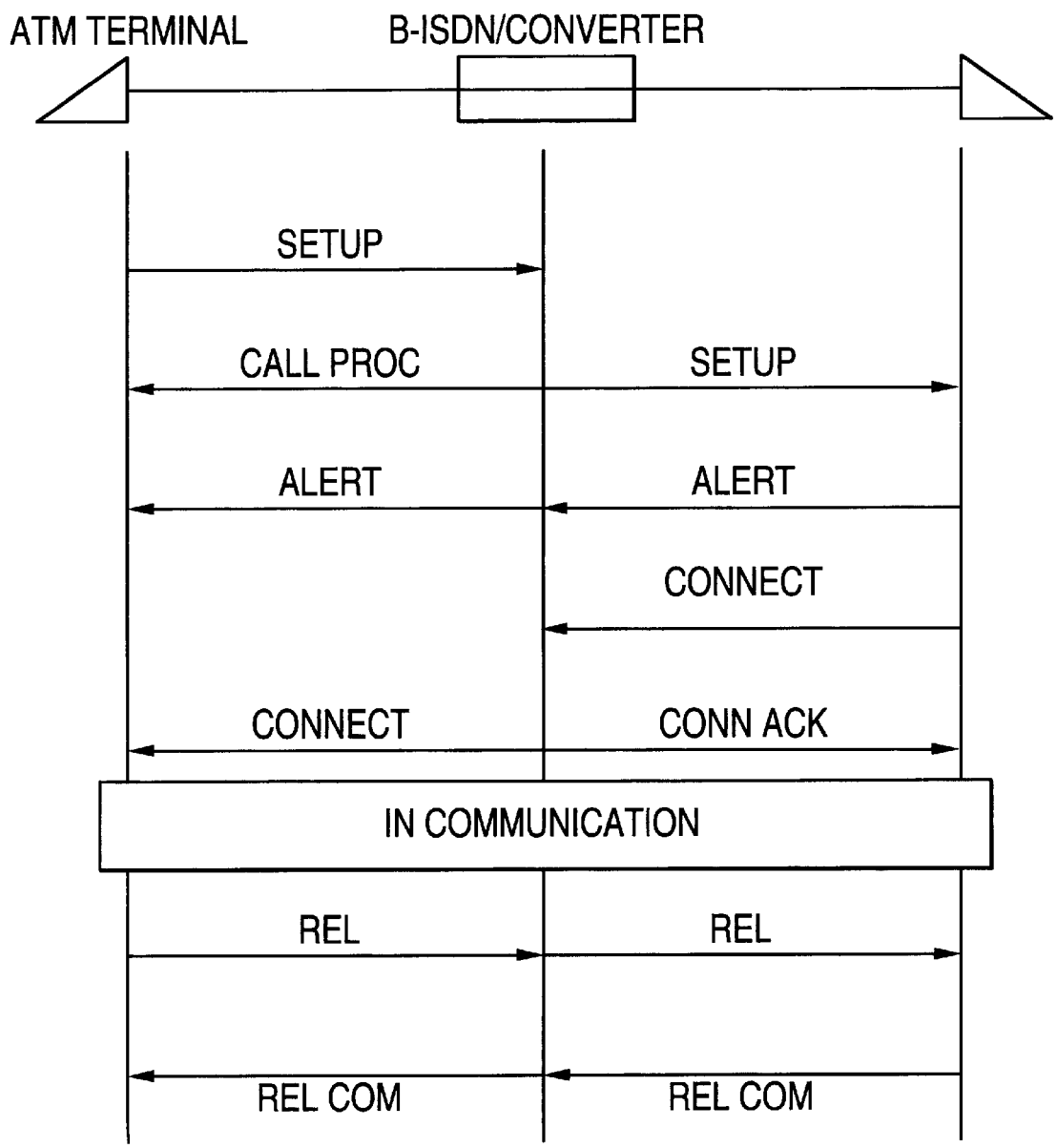
FIG. 4 is a sequence diagram illustrating calling setup/releasing sequence in B-ISDN.
Figure 5:
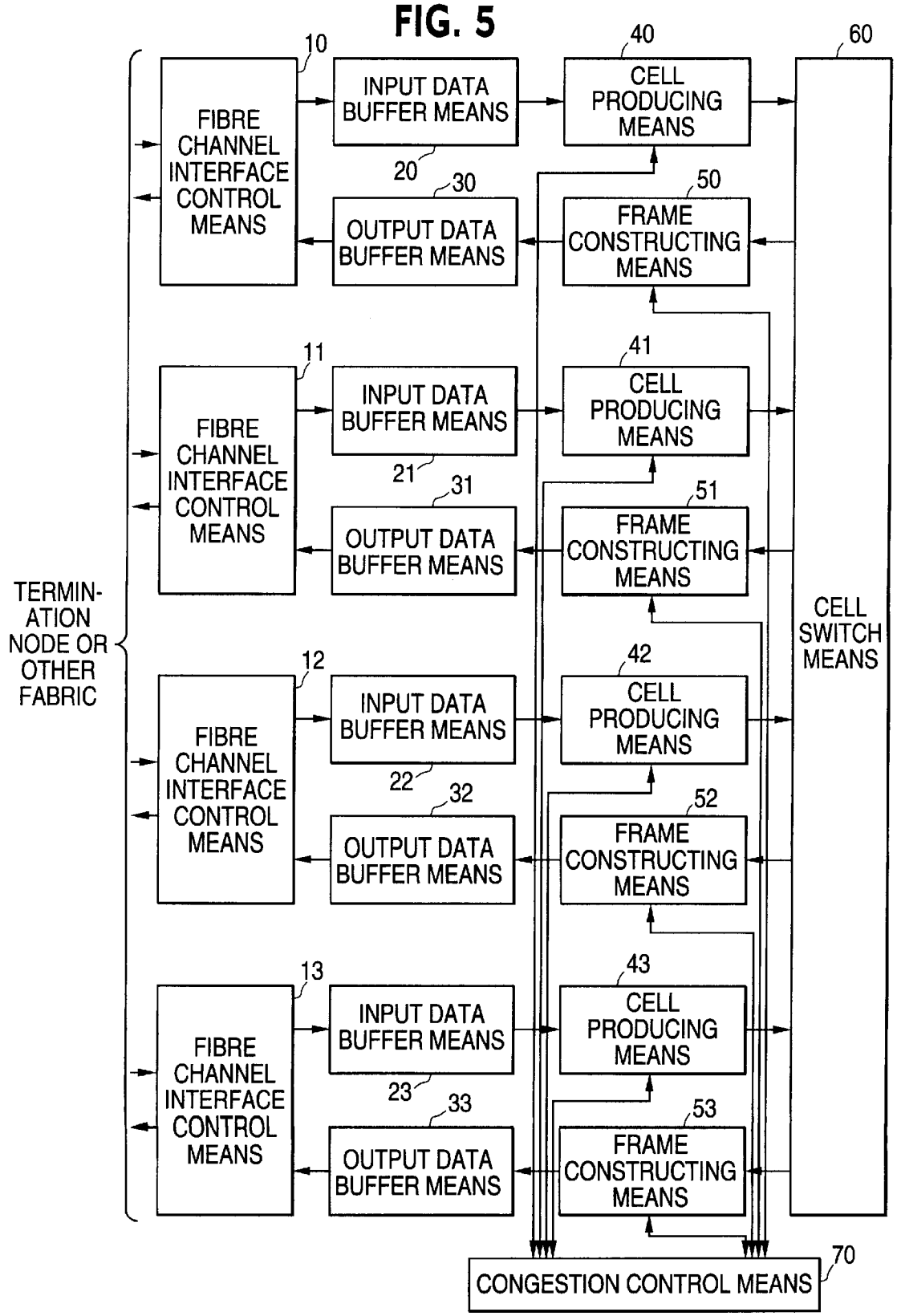
FIG. 5 is a block diagram of a fibre channel fabric in accordance with a referred embodiment of the present invention.

With reference to FIG. 5, a fibre channel fabric in accordance with a preferred embodiment of the present invention includes a plurality of fibre channel interface control means 10, 11, 12 and 13, a plurality of input data buffer means 20, 21, 22 and 23, a plurality of output data buffer means 30, 31, 32 and 33, a plurality of cell producing means 40, 41, 42 and 43, a plurality of frame constructing means 50, 51, 52 and 53, cell switch means 60 for controlling the above-mentioned means, and congestion controlling means 70. For instance, one fibre channel interface control means 10, one input data buffer means 20, one output data buffer means 30, one cell producing means 40, and one frame constructing means 50 cooperate with one another to thereby form a fabric to which either a single termination node or a single another fabric is connected. The fibre channel fabric illustrated in FIG. 5 is a fabric to which four termination nodes or other fabrics can be connected. By increasing the number of sets each of which comprises one fibre channel interface control means, one input data buffer means, one output data buffer means, one cell producing means, and one frame constructing means, the greater number of termination nodes or other fabrics may be connected to the illustrated fibre channel fabric.

The fibre channel interface control means 10 to 13 control communication of a frame of a fibre channel to be made with a termination node or other fabrics, in accordance with ANSI standards. The control accomplished by the fibre channel interface control means 10 to 13 includes flow control and class service control. The fibre channel interface control means 10 to 13 are able to control transmitting a frame simultaneously with receiving a frame. That is, the fibre channel interface control means 10 to 13 accomplish full duplex communication in accordance with fibre channel standards.

The input data buffer means 20 to 23 temporarily store a frame received from a termination node or other fabrics. In addition, the input data buffer means 20 to 23 are designed to have a function of absorbing a difference between a communication rate on a fibre channel and a cell interchange rate in the cell switch means 60. Accordingly, memory capacity of the input data buffer means 20 to 23 is determined based on a relation among a communication rate on a fibre channel, a cell interchange rate in the cell switch means 60, and a maximum frame length of a fibre channel.

The output data buffer means 30 to 33 temporarily store a fragment of a frame transmitted from the cell switch means 60. Similarly to the input data buffer means 20 to 23, the output data buffer means 30 to 33 are designed to have a function of absorbing a difference between a communication rate on a fibre channel and a cell interchange rate in the cell switch means 60. Accordingly, memory capacity of the output data buffer means 30 to 33 is determined based on a relation among a communication rate on a fibre channel, a cell interchange rate in the cell switch means 60, and a maximum frame length of a fibre channel.

The cell producing means 40 to 43 divide a frame of a fibre channel into fixed length cells to which the cell switch means 60 can carry out cell interchange. In addition, the cell producing means 40 to 43 provide a cell with information indicating effective data contained in a last cell in a frame.

Figure 6:
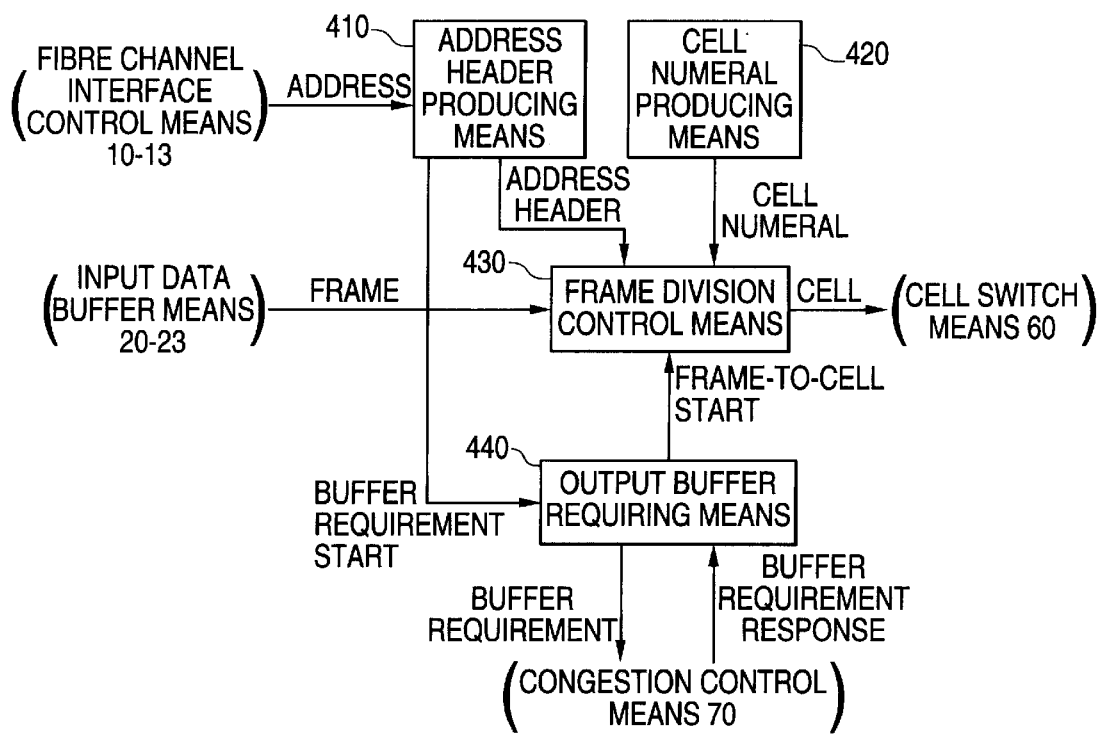
FIG. 6 is a block diagram of cell producing means in the preferred embodiment.

FIG. 6 illustrates an example of a structure of the cell producing means 40 to 43. Each of the cell producing means 40 to 43 includes address header producing means 410, cell numeral producing means 420, frame division control means 430, and output buffer requiring means 440.

The address header producing means 410 converts address data contained in a frame of a fibre channel into internal address data necessary for the cell switch means 60 to carry out cell interchange. The cell numeral producing means 420 produces a cell sequence numeral necessary for detecting cell loss. The frame division control means 430 adds both an address header produced by the address header producing means 410 and a cell numeral produced by the cell numeral producing means 420 into a fragment of a frame taken out of the input data buffer means 20 to 23 to thereby produce a fixed length cell, and transfers the thus produced fixed length cell to the cell switch means 60. Herein, a size of a cell is determined in dependence on specification of the cell switch means 60. The output buffer requiring means 440 cooperates with the congestion controlling means 70 to thereby manage output buffer status, and control operation timing of the frame division control means 430 so that a load over a predetermined magnitude is not exerted on the cell switch means 60.

The frame constructing means 50 to 53 reconstruct a frame of an original fibre channel on the basis of cells transmitted from the cell switch means 60. When receiving a final cell constituting a frame, the frame constructing means 50 to 53 extract data necessary for an original fibre channel frame out of information indicating effective data, contained in control data of the final cell.

Figure 7:
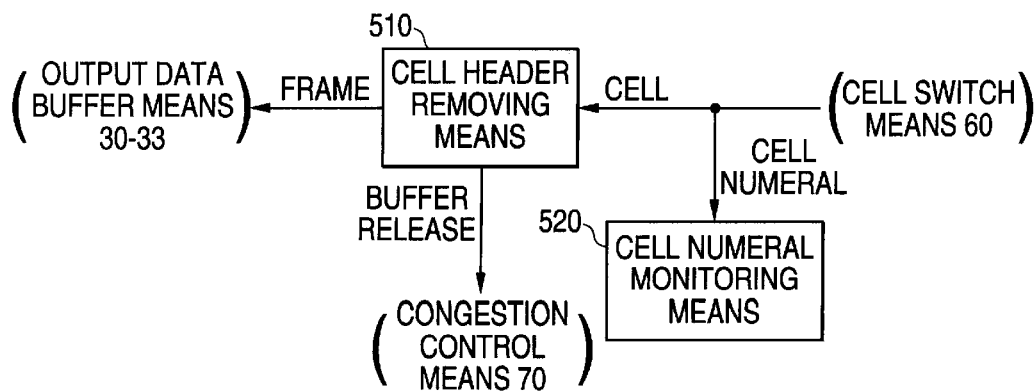
FIG. 7 is a block diagram of frame constructing means in the preferred embodiment.

FIG. 7 illustrates an example of a structure of the frame constructing means 50 to 53. As illustrated, each of the frame constructing means 50 to 53 includes cell header removing means 510 and cell numeral monitoring means 520.

The cell header removing means 510 removes cell control data such as an address header out of a cell transferred from the cell switch means 60 to thereby extract only a fragment of a frame of an original fibre channel. The thus extracted fragment is transferred to the output data buffer means 30 to 33. The cell numeral monitoring means 520 monitors an order of cells received from the cell switch means 60 by virtue of the cell numeral contained in each of cells, to thereby check whether cell loss occurs.

The cell switch means 60 distributes a cell to an associated one of the frame constructing means 50 to 53 in accordance with an address header contained in each of cells transferred from the cell producing means 40 to 43.

The congestion control means 70 cooperates with the cell producing means 40 to 43 and the frame constructing means 50 to 53 to thereby manage operation status of the output data buffer means 30 to 33 so as to control a load to be exerted on the cell switch means 60 so that the load does not exceed a critical magnitude.

Figure 8:
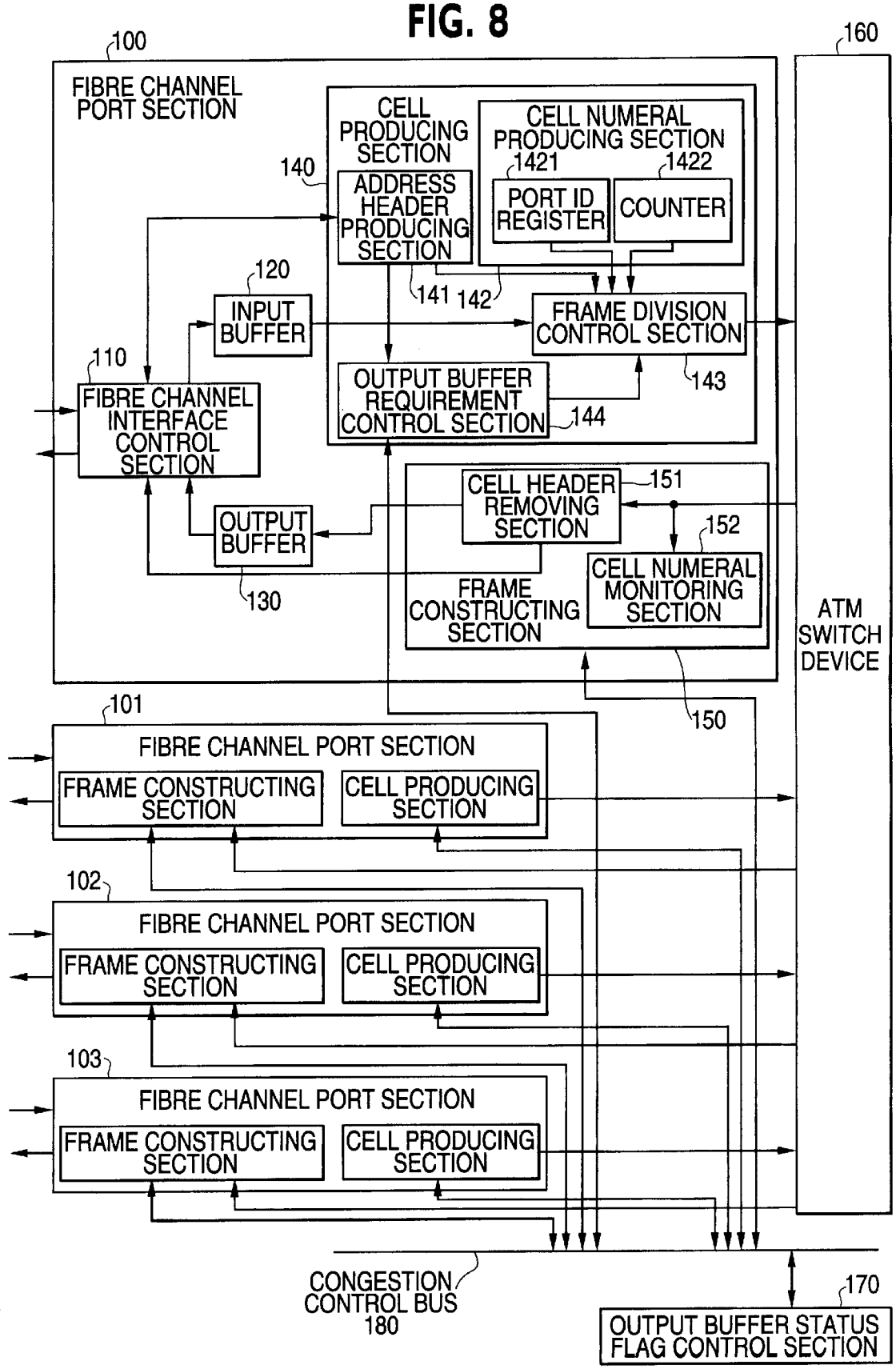
FIG. 8 is a block diagram of a fibre channel fabric in accordance with another preferred embodiment of the present invention.

FIG. 8 is a block diagram of a fibre channel fabric in accordance with another preferred embodiment of the present invention. As illustrated, the fibre channel fabric is comprised of three sections for accomplishing a function. Specifically, the illustrated fibre channel fabric includes fibre channel port sections 100, 101, 102 and 103, ATM switch device 160 which is equivalent to the cell switch means 60, and output buffer status flag control section 170 carrying out congestion management. The instant embodiment exemplifies a fibre channel fabric to which totally four termination nodes or other fabrics may be connected. It should be noted that it would be possible for the fibre channel fabric in accordance with the instant embodiment to increase the number of connection nodes merely by adding fibre channel port sections thereto, and replacing the ATM switch device 160 with another ATM switch device which can deal with the increased number of connection nodes.

The fibre channel port section 100 includes a fibre channel interface control section 110, an input buffer 120, an output buffer 130, a cell producing section 140, and a frame constructing section 150. The fibre channel interface control section 110, the input buffer 120, the output buffer 130, the cell producing section 140, and the frame constructing section 150 correspond in function to the fibre channel interface control means 10, the input data buffer means 20, the output data buffer means 30, the cell producing means 40, and the frame constructing means 50 all illustrated in FIG. 5, respectively.

The cell producing section 140 includes an address header producing section 141, a cell numeral producing section 142, a frame division control section 143, and an output buffer requirement control section 144. The address header producing section 141, the cell numeral producing section 142, the frame division control section 143, and the output buffer requirement control section 144 correspond in function to the address header producing means 410, the cell numeral producing means 420, the frame division control means 430, and the output buffer requiring means 440 all illustrated in FIG. 6, respectively.

The cell numeral producing section 142 includes a port identifier register 1421 for retaining a port number of the associated fibre channel port section, and a counter 1422 countable up to 45. The counter 1422 is initialized to "1" prior to frame division accomplished by the frame division control section 143.

The frame constructing section 150 includes a cell header removal controlling section 151, and a cell numeral monitoring section 152. The cell header removal controlling section 151 and the cell numeral monitoring section 152 correspond in function to the cell header removing means 510 and the cell numeral monitoring means 520 both illustrated in FIG. 7, respectively.

Though not illustrated in FIG. 8, the other fibre channel port sections 101, 102 and 103 have the same structure as that of the fibre channel port section 100.

The cell producing section 140 and the frame constructing section 150 both mounted on each one of the fibre channel port sections 100 to 103 are connected to the output buffer status flag control section 170 through a congestion control bus 180, as illustrated in FIG. 8.

Figure 9:
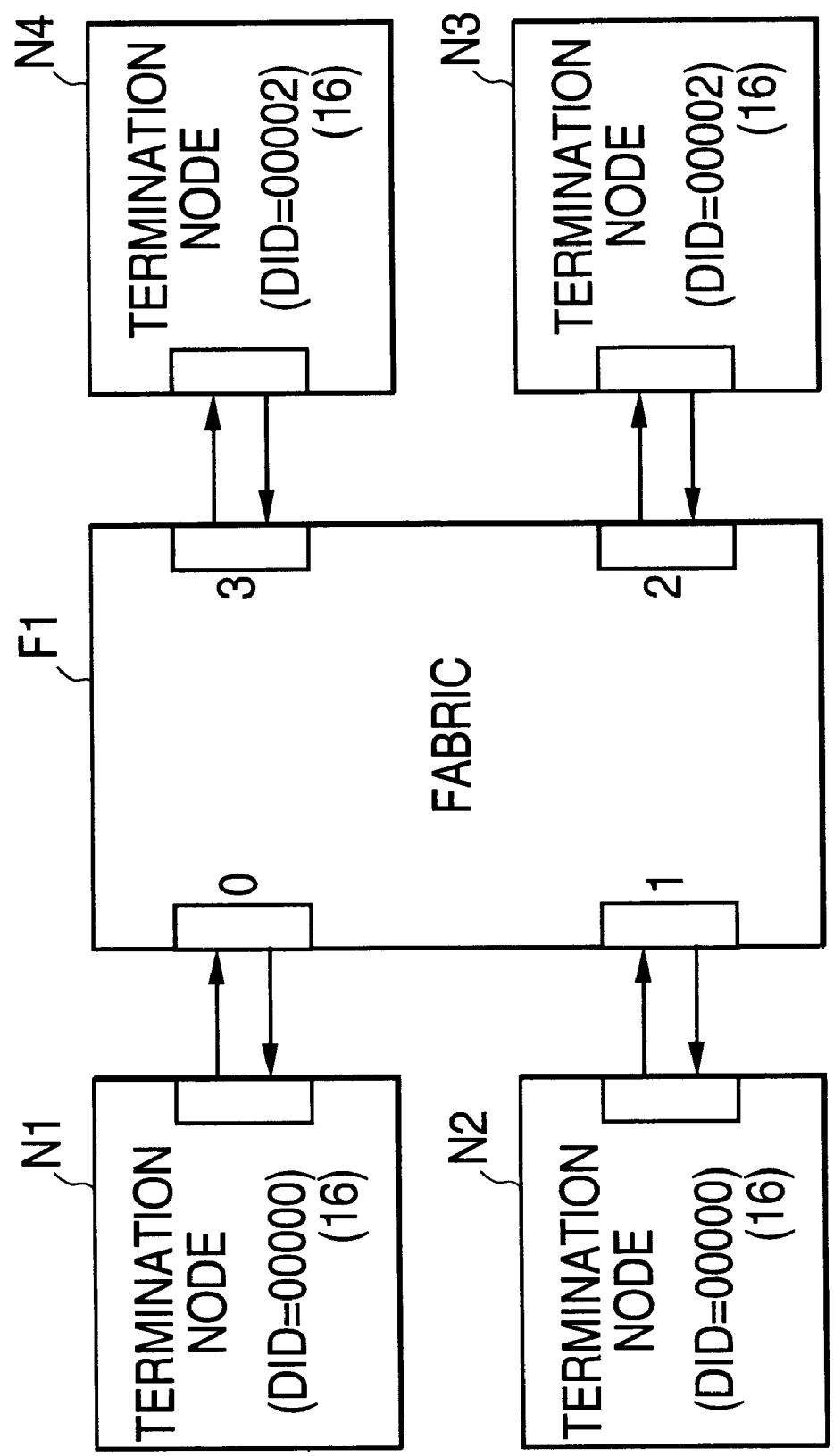
FIG. 9 is a block diagram of a computer system including a fibre channel fabric in accordance with the another preferred embodiment of the present invention.
Figure 10:
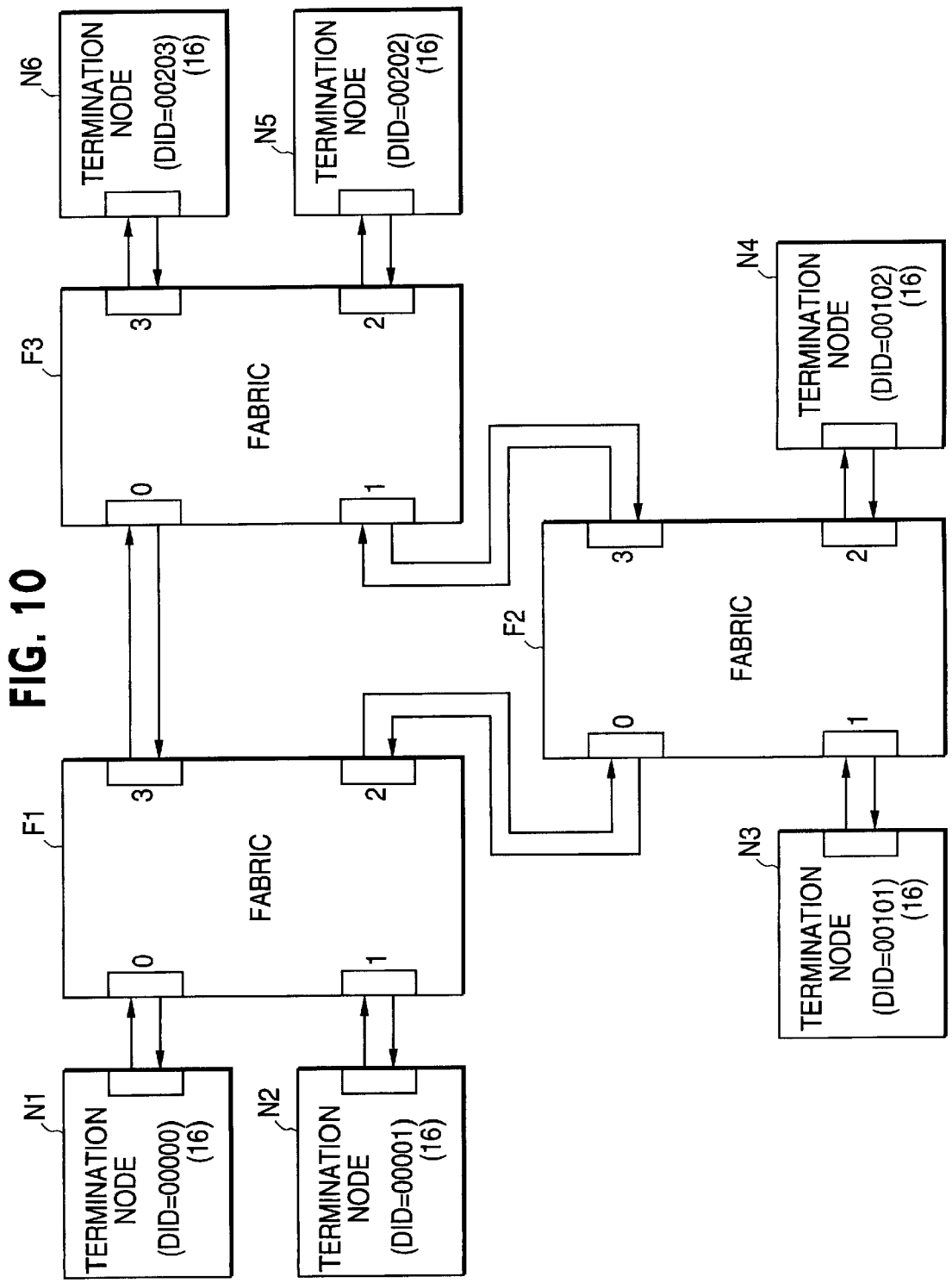
FIG. 10 is a block diagram of another computer system including a fibre channel fabric in accordance with the another preferred embodiment of the present invention.

FIGS. 9 and 10 illustrate examples of computer systems employing the fibre channel fabric in accordance with the instant embodiment. FIG. 9 illustrates an example of a computer system comprising four termination nodes N1 to N4 and the fibre channel fabric F1 in accordance with the instant embodiment, illustrated in FIG. 8, and FIG. 10 illustrates an example of a computer system comprising six termination nodes N1 to N6 and three fibre channel fabrics F1 to F3 in accordance with the instant embodiment, illustrated in FIG. 8.

Hereinbelow is explained the operation of the computer system illustrated in FIG. 9 on the premise that: (a) the fibre channel fabric illustrated in FIG. 8 corresponds to the fabric F1 in the computer system illustrated in FIG. 9; (b) each one of the termination nodes N1 to N4 is connected to the fabric channel interface control section 110 in each one of the fibre channel port sections 100 to 103 of the fabric F1; and (c) the termination node N1 transmits one frame to the termination node N4 under the class 2 transfer mode.

Herein, the class 2 transfer mode in a fibre channel is a mode where data frame transfer is accomplished without carrying out calling setup between termination nodes (in the example described hereinbelow, between the termination nodes N1 and N4) prior to data frame transfer. 3-byte node ID unique in the computer system is assigned to each one of the termination nodes N1 and N2 of a fibre channel. In communication between the termination nodes N1 to N4, an address of a frame is identified with the node ID. The node ID is assigned to the termination nodes N1 to N4 by the fabric F1 in accordance with an inherent sequence called fabric log-in, when the computer system starts. Each one of the termination nodes can know the node ID of other termination nodes connected thereto through the fabric F1, by virtue of a sequence called node log-in.

The operation is explained hereinbelow on the premise that: (a) fabric log-in and node log-in have been already completed; (b) node IDs 1 to 4 are assigned to the termination nodes N1 to N4, respectively; and (c) each one of the termination nodes N1 to N4 already knows the node IDs of the other termination nodes.

Figure 11:
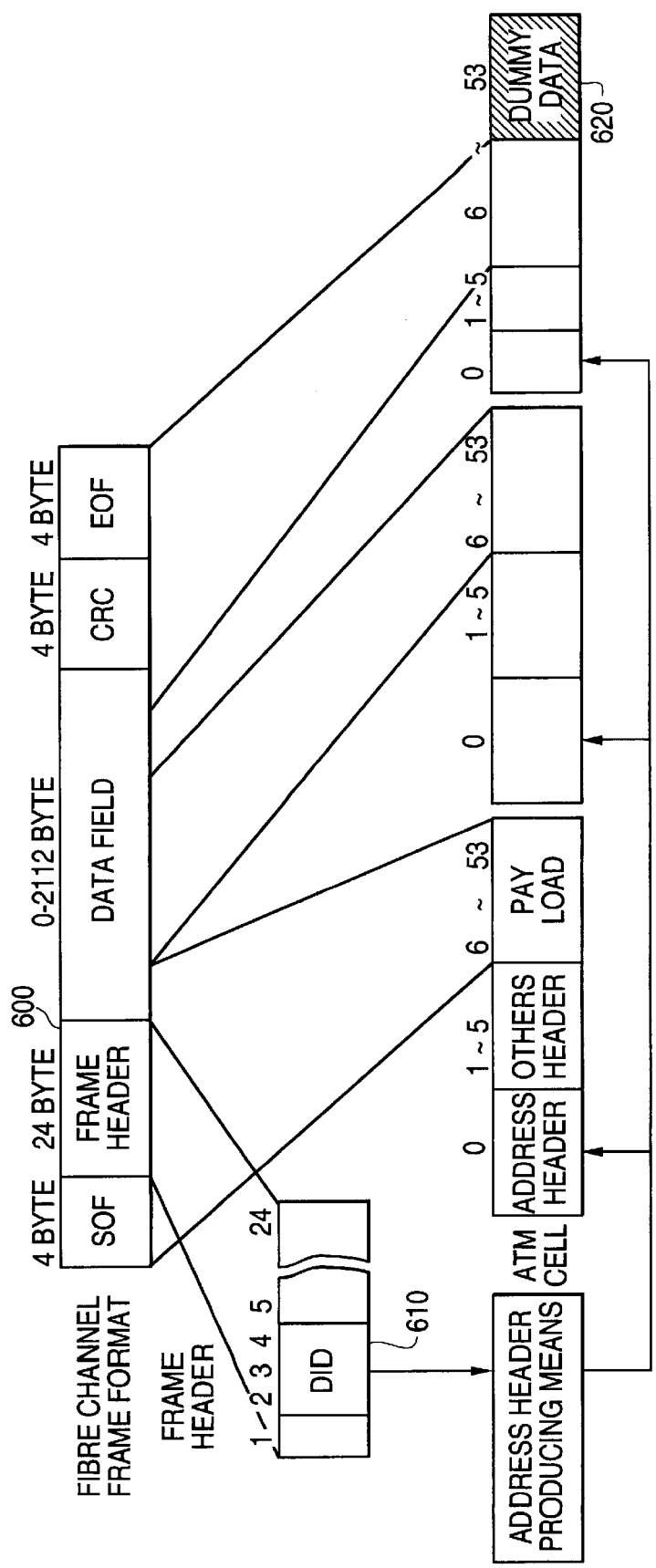
FIG. 11 is a schematic view showing a relation between frame format of a fibre channel and a cell.

When the termination node N1 transfers a frame to the termination node N4 under class 2, the termination node N1 forms a frame where the node ID of the termination node N4 is arranged in 3 byte DID (Destination Identifier) field 610 located in a frame header 600 of a frame of a fibre channel illustrated in FIG. 11. Then, the frame is transferred to the fabric F1 in accordance with fibre channel standard.

The thus transferred frame is received in the interface control section 110 of the fibre channel port section 100 associated with the termination node N1 of the fabric F1. The fibre channel interface control section 110 stores the thus received frame in the input buffer 120, and at the same time, takes DID 610 out of a frame header 600 of the frame, and informs the DID of the address header producing section 141 in the cell producing section 140.

The address header producing section 141 converts the DID (which is "4" in the instant embodiment) of the termination node N4 into an address header to be transmitted to the ATM switch device 160, in accordance with a predetermined algorithm, and instructs the output buffer requirement control section 144 to start operation. The output buffer requirement control section 144 checks, through the congestion control bus 180, status of the output buffer 130 of the fibre channel port section 103 associated with the termination node N4. If the output buffer 130 were found to be usable, the output buffer requirement control section 144 causes the frame division control section 143 to start.

The frame division control section 143 transfers the following data (a) to (e) to ATM switch device 160 in order: (a) an address header retained in the address header producing section 141; (b) an input port numeral (herein, which is "1" indicating the fibre channel port section 100) retained in the port ID register 1421 of the cell numeral producing section 142; (c) a cell numeral produced by the cell numeral producing section 142; (d) effective data information and 2 byte dummy data both managed by the frame division control section 143; and (e) 48 byte data at the head of a frame taken out of the input buffer 120.

Figure 12:
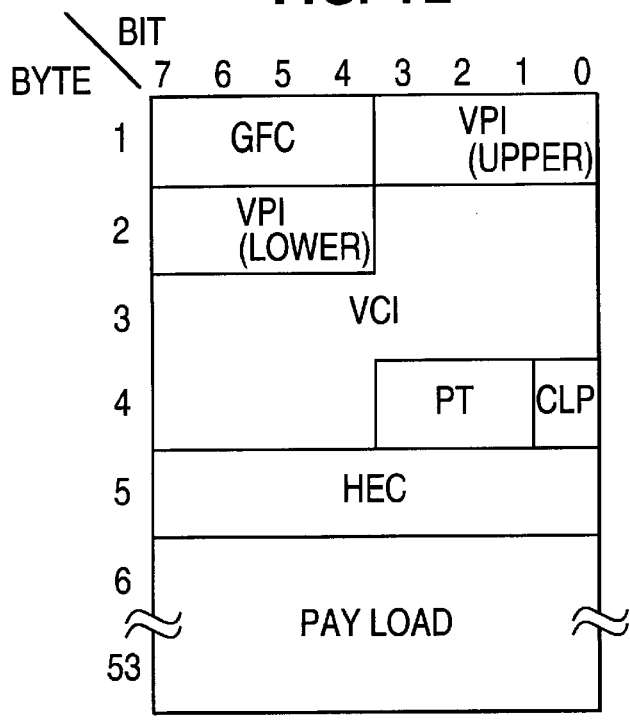
FIG. 12 is a schematic view illustrating ATM cell format.
Figure 13:
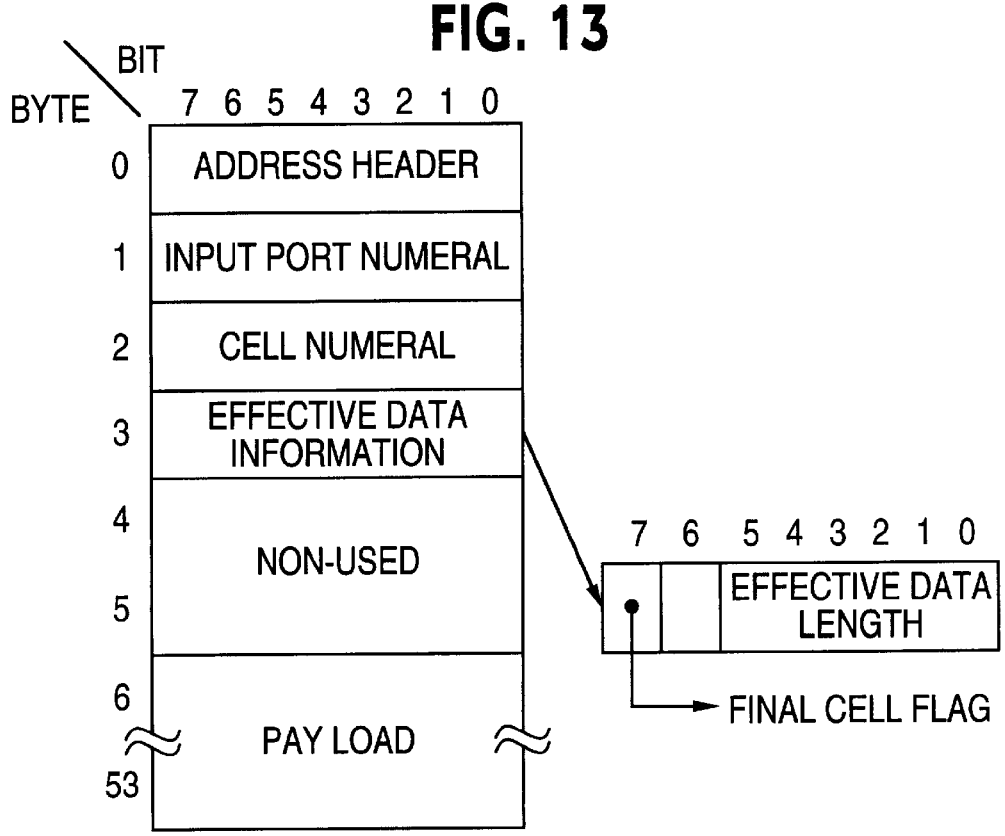
FIG. 13 is a schematic view illustrating a format of a cell used in the another preferred embodiment of the present invention.

FIG. 12 illustrates an original format of ATM cell, whereas FIG. 13 illustrates a format of a cell to be transferred to ATM switch device 160. In general, ATM switch device does not interpret address data represented with VPI/VCI in ATM header, but carry out cell interchange control by employing an address header added to a head of a cell. The address header corresponds to an address header at zero-th byte in FIG. 13. A size of an address header and a data format are dependent on ATM device used. In the instant embodiment, ATM switch employing one byte address header is to be used, but it should be noted that even if address header formats were different, such a difference might be eliminated merely by changing conversion algorithm of the address header producing section 141.

The above-mentioned 1 byte input port numeral is transferred to ATM switch device 160 in order to collect fault data when defect such as cell loss is detected. However, the 1 byte input port numeral may be omitted from data to be transferred to ATM switch device 160.

The frame division control section 143 is informed of a frame length from the fibre channel interface control section 110 in a predetermined manner, and divides a frame of a fibre channel starting from SOF (Start of Frame) and ending at EOF (End of Frame) into 48 byte sections in ATM payload in accordance with the informed frame length. The thus divided frame is transferred to ATM switch device 160 in turn. When the frame division control section 143 transfers all the divided frames to ATM switch device 160, the frame division control section 143 transmits a signal indicating that to the fibre channel interface control section 110. The fibre channel interface control section 110 receiving the signal informs the termination node N1 in accordance with fibre channel standard that the termination node N1 is allowed to receive a next frame.

Then, the frame division control section 143 produces information indicating effective data relating to a final cell in the divided cell, and buries the information in the third byte in a cell, namely effective data information field. For instance, if the termination node N1 transfers a frame including 48 byte data in the instant embodiment, a frame length would be 48 byte. The frame is divided into two cells, in which a second or final cell is 36 byte long. However, since ATM switch device 160 carries out cell interchange at the unit of a cell having fixed length of 54 byte including an address header, the frame division control section 143 is required to design the final cell to be 54 byte long. To this end, the frame division control section 143 would have to fill 12 byte located at a trailing end of payload with dummy data 620. As data for removing the dummy data 620 when a frame is constructed, it is indicated in the effective data information field in FIG. 13 that effective data is 36 byte long. As illustrated in FIG. 13, there may be formed a flag in the effective data information field for indicating whether a cell in question is a final one. Thus, there is produced a cell having the effective data information field where information indicating effective data is buried, and also having a flag turned on, indicating a cell in question is a final cell. The flag is used to distinguish a final cell from non-final cells when effective data in a final cell is 48 byte long. When a cell in question is a non-final cell, the frame division control section 143 always buries 48 byte data in an effective data information field thereof, and produces a cell in which a final cell indicating flag is turned off.

Then, the cell numeral producing section 142 causes the counter 1422 to make an increment each time when a cell is transferred from the time when a frame is started to be divided, and assigns the thus obtained counter value to a cell in question as a cell numeral. Thus, each of cells is assigned a cell numeral which indicates an order in an original frame. Each of cells having the thus assigned cell numeral is cell-interchanged in ATM switch device 160 in accordance with an address header, and is transmitted to the frame constructing section 150 associated with the address. In the instant embodiment, the thus interchanged cell is transmitted to the frame constructing section 150 of the fibre channel port section 103 associated with the termination node N4.

In the fibre channel port section 103, the cell header removing control section 151 constituting the frame constructing section 150 removes six bytes, from the zero-th to fifth bytes, of ATM cell illustrated in FIG. 13, and stores the rest, namely 48 bytes in the payload, in the output buffer 130. The cell header removing control section 151 monitors the effective data information field, and, when the final cell flag is on, stores the payload in the output buffer 130 in a degree indicated by the effective data length.

The cell header removing control section 151 informs the fibre channel interface control section 110 that the payload has started to be stored in the output buffer 130. Then, the fibre channel interface control section 110 informed of the above transfers data stored in the output buffer 130 to the termination node N4.

The cell numeral monitoring section 152 monitors cell numerals of cells transmitted from the ATM switch device 160. If the cell numeral monitoring section 152 found that the cell numerals are not in ascending order, the cell numeral monitoring section 152 considers it as occurrence of cell loss, and informs the fibre channel interface control section 110 of the fact so as to request to carry out disposal to abnormal condition in accordance with fibre channel standard.

After the cell header removing control section 151 finishes storing a final cell in the output buffer 130, the cell header removing control section 151 instructs the output buffer status flag control section 170 through the congestion control bus 180 to release the output buffer 130.

Hereinbelow is explained calling setup control made by the fibre channel fabric in accordance with the embodiment, with reference to FIGS. 14 and 15.

Figures 14, 15, 16:
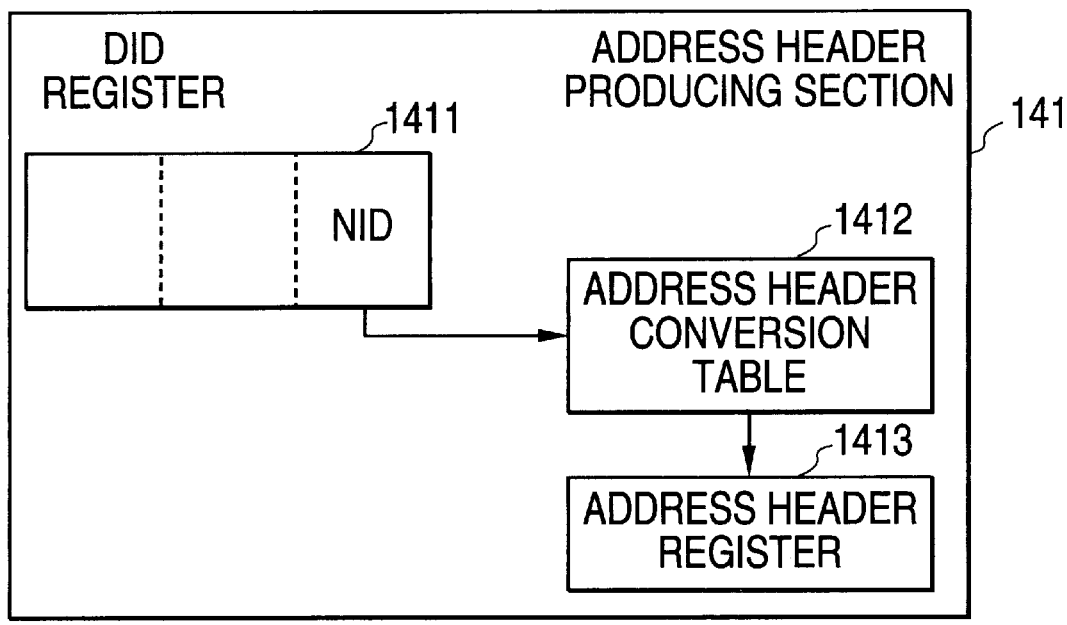
FIG. 14 is a block diagram of cell producing means in the another preferred embodiment of the present invention.
FIG. 15 illustrates an example of a conversion table arranged in an address header conversion table.
FIG. 16 illustrates another example of a conversion table arranged in an address header conversion table.

FIG. 15 illustrates a conversion table between DID and an address header. As mentioned earlier, DID is a value which indicates node ID of a location to which a frame is transferred, contained in the frame of a fibre channel frame. Node ID is a unique value assigned to each of termination nodes from a fibre channel fabric when a computer system is started, and specific content of the value is determined by the fibre channel fabric. Since four termination nodes or other fabrics at greatest may be connected to the fibre channel fabric in accordance with the instant embodiment, four unique values at greatest may be determined as node IDs (NID). Thus, as illustrated in FIG. 15, numerals 0 to 3 are assigned to node IDs of the termination nodes, and there are prepared conversion tables for each one of the node IDs. Each one of the conversion tables is associated with an address header of ATM cell. Herein, a 1 byte address header is to be used.

FIG. 14 illustrates an example of a structure of the address header producing section 141. As illustrated, the address header producing section 141 includes a DID register 1411, an address header conversion table 1412, and an address header register 1413.

The DID register 1411 stores therein DID of a received frame, transmitted from the fibre channel interface control section 110. The instant embodiment utilizes only a lowermost byte (strictly, only lowermost two bits) among 3 bytes DID. Data which will make an address header is read out of the address header conversion table 1412 with the lowermost byte being used as an address. The thus read out data is stored in the address header register 1413. For instance, the address header conversion table 1412 may be constituted of static random access memory (SRAM).

The frame division control section 143 of a fibre channel fabric produces a cell by adding data stored in the address header register 1413 to address header fields of all of cells.

By carrying out the above-mentioned operation, it is possible to carry out calling setup frame by frame to thereby accomplish cell interchanges without carrying out calling setup between termination nodes prior to transfer of a data frame.

The above-mentioned instant embodiment is in particular suitable to a system illustrated in FIG. 9 where only termination nodes are connected to a fabric, and provides an advantage that calling setup can be carried out frame by frame at high speed by means of a quite simple structure. In addition, since calling setup to the next frame doubles as calling release to the prior frame, the instant embodiment provides an additional advantage that it is no longer necessary to carry out calling release.

It should be noted that the address header register 1413 is added to the address header producing section 141 merely for more proper operation, and that the address header register 1413 may be omitted. The address header conversion table 1412 may be designed to transmit an output thereof directly to the frame division control section 143 not through the address header register 1413.

FIG. 16 illustrates an example of a conversion table for a case where address headers of ATM switch device are 2 bytes, and values of the address headers are not in simple ascending order. Even such ATM switch device might be readily used simply by changing a conversion table or an address header conversion table.

Another example of calling setup control by means of the fibre channel fabric in accordance with the instant embodiment is explained hereinbelow with reference to FIGS. 17 and 18A–18C.

The instant example is in particular suitable to calling setup control of a fibre channel fabric in a computer system including a plurality of fibre channel fabrics, illustrated in FIG. 10. Hereinbelow is explained calling setup control for a computer system where three fabrics F1 to F3 are connected to one another, and totally six termination nodes N1 to N6 are connected to fibre channel ports which are not used for connecting fabrics to each other.

Figure 17:
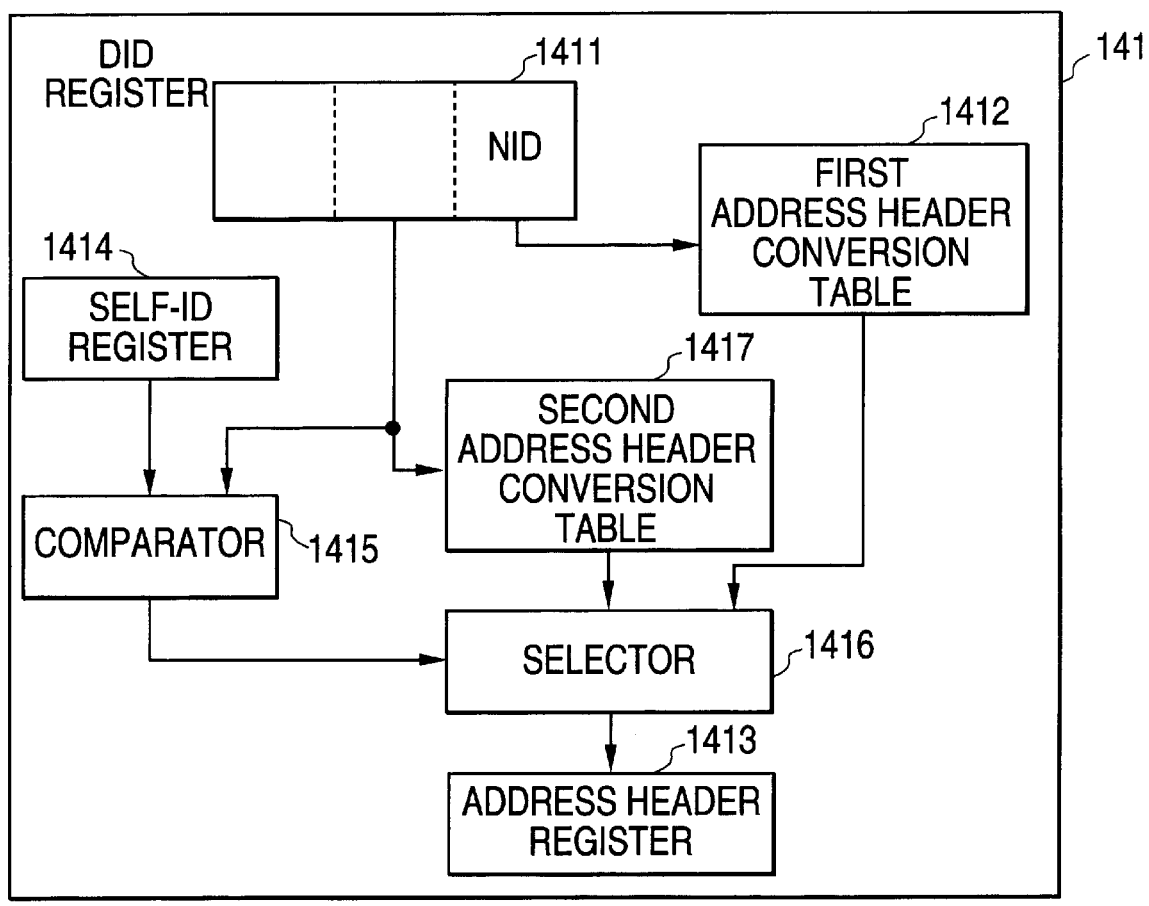
FIG. 17 is a block diagram of address header producing means in the another preferred embodiment of the present invention.

FIG. 17 illustrates another example of a structure of the address header producing section 141. The illustrated address header producing section 141 includes DID register 1411, a first address header conversion table 1412, an address header register 1413, a self-ID register 1414, a comparator 1415, a selector 1416, and a second address header conversion table 1417.

DID register 1411, the first address header conversion table 1412 and the address header register 1413 have the same function as that of the corresponding elements of the address header producing section 141 illustrated in FIG. 14. The address header producing section 141 in FIG. 17 assigns fabric ID (FID) for identifying a fabric to second byte in DID, assigns node ID (NID) for identifying a termination node to third byte in DID, and does not use first byte in DID. Each of the first address header conversion tables 1412 in the fabrics F1 to F3 is comprised of a conversion table such as one illustrated in FIG. 15.

The self-ID register 1414 stores FID of a fabric to which the self-ID register 1414 belongs. The comparator 1415 compares FID of DID register 1411 to a value of the self-ID register 1414, and informs comparison results of the selector 1416. The selector 1416 stores one of outputs from the first address header conversion table 1412 and the second address header conversion table 1417 in the address header register 1413 in accordance with the comparison results transmitted from the comparator 1415. The second address header conversion tables 1417 in the fabrics F1 to F3 are designed to have conversion tables illustrated in FIGS. 18A to 18C, respectively.

Hereinbelow is explained an operation of a case where a termination node N1 transmits a frame to another termination node N2 connected to the fabric F1 to which the termination node N1 is also connected.

The fabric F1 stores DID of a frame received from the termination node N1 in the DID register 1411. Then, the comparator 1415 compares FID stored in second byte in DID to a value of the self-ID register 1414 storing FID of the fabric F1 therein. Since the termination node N2 to which a frame is to be transmitted is connected to the fabric F1 to which the termination node N1 from which a frame is to be transmitted to the termination node N2 is connected, the comparator 1415 outputs a comparison result indicating that they are coincident with each other. As a result, the selector 1416 selects an output transmitted from the first address header conversion table 1412, and stores the thus selected output in the address header register 1413. Since third byte in DID register 1411, or an output from NID is input in the first address header conversion table 1412 as an address, an address header which is dependent on ATM switch device can be produced by carrying out the same calling setup control as one explained with reference to FIG. 14.

Hereinbelow is explained an operation of a case where a termination node N1 connected to the fabric F1 transmits a frame to a termination node N6 connected to the fabric F3.

A frame transmitted from the termination node N1 is first received in the fabric F1, and then DID in the received frame is stored in DID register 1411. The fabric F1 compares FID of itself to FID of an address termination node contained in DID. Since the termination nodes N1 and N6 are connected to different fabrics, comparison result indicates that they are not coincident. Then, the fabric F1 transmits FID value in second byte in DID register 1411 to the second address header conversion table 1417 as an address, and the selector 1416 stores an output transmitted from the second address header conversion table 1417 in the address header register 1413. A conversion table illustrated in FIG. 18A is stored in the second address header conversion table 1417 in the fabric F1. Herein, the fabric F3 is selected as a fabric to which a frame is to be transmitted. Thus, a frame transmitted from the termination node N1 is transferred to the fabric F3 through the fabric F1. When receiving the frame, the fabric F3 transfers the frame to the termination node N6 in the same operation as the above-mentioned operation carried out by the fabric F1 for transferring a frame from the termination node N1 to the termination node N2.

Figure 19:
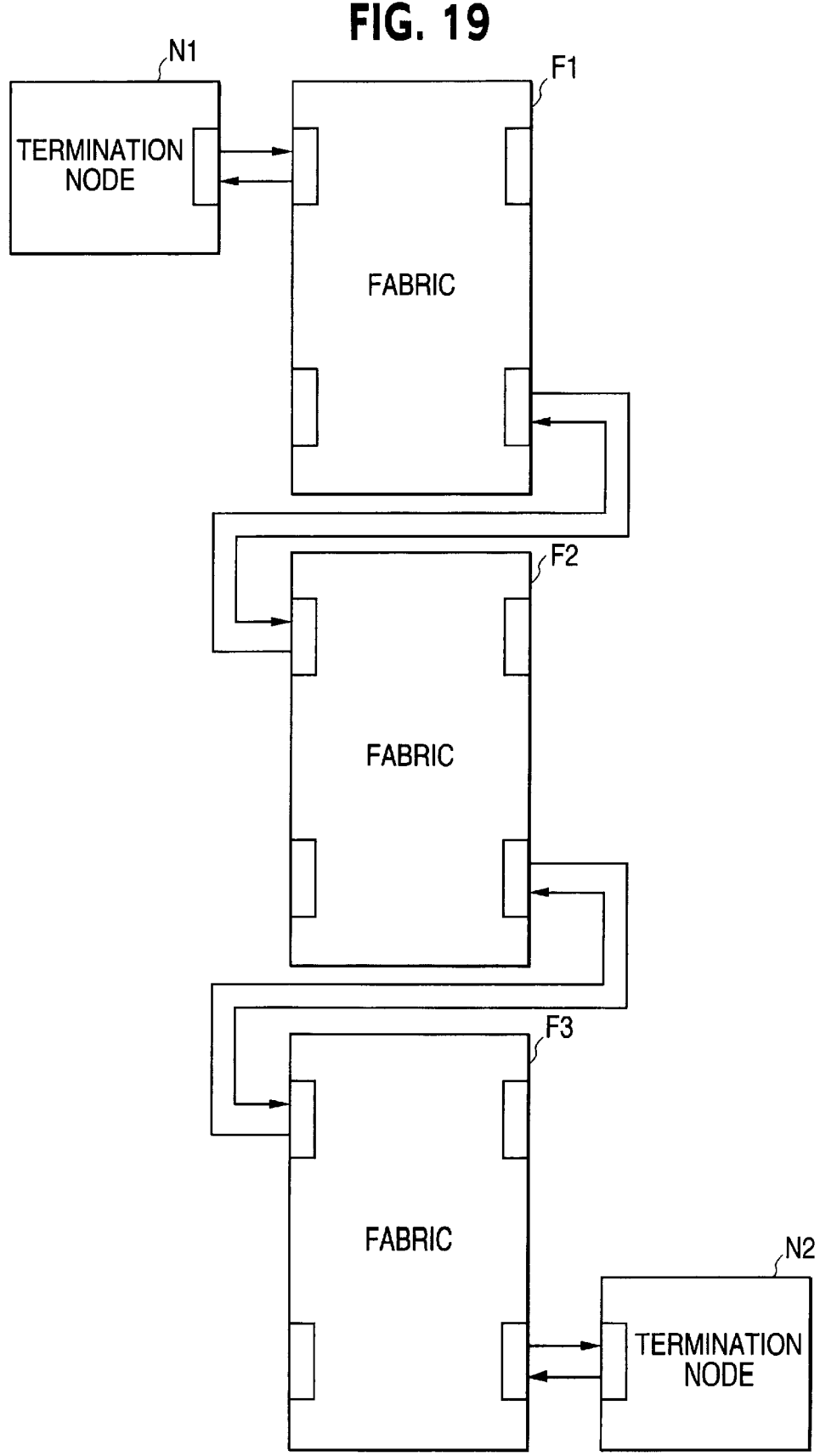
FIG. 19 is a block diagram of still another computer system including a fibre channel fabric in accordance with the another preferred embodiment of the present invention.

As illustrated in FIGS. 18A to 18C, the conversion tables arranged in the second address header conversion tables 1417 of the fabrics F1 to F3 are provided with a transfer path to a fabric, to which a termination node in question is connected, as an address for a frame to be transmitted to a termination node connected to another fabric. Even when a termination node to which a frame is to be finally transmitted belongs to another fabric which is not directly connected to a fabric receiving a frame, it would be possible to construct multiple connection of fabrics by arranging a path leading to an intermediate fabric which in turn leads to an address termination node. For instance, when the termination node N1 transmits a frame to the termination node N2 in a computer system illustrated in FIG. 19, the fabric F1 in advance prepares a conversion table so as to transfer the frame to the fabric F2.

The calling setup control having been explained so far with reference to FIGS. 17 and 18A–18C provides an advantage that calling setup control can be carried out with a simply structured hardware even in a computer system having a plurality of fabrics and a plurality of termination nodes.

Hereinbelow, congestion control of a fibre channel fabric is explained with reference to FIGS. 20 and 21.

FIG. 20 illustrates an example of a structure of the output buffer status flag control section 170. The output buffer status flag control section 170 comprises a bus arbitration control section 171, and an output buffer status flag register 172. As illustrated in FIG. 21, the output buffer status flag resister 172 is a totally four bits register addressed by two bits per a bit.

The bus arbitration control section 171 receives requirements for buffer requirement control b01 to b04 transmitted from the cell producing section 140, and requirements for buffer release control b05 to b08 transmitted from the frame constructing section 150, and transmits allowances for using a bus b11 to b18 in response to the eight requirements b01 to b08. Both a 2 bits address bus 181 and a 1 bit data bus 182 are connected to the output buffer status flag register 172. A control for writing into and reading out of the output buffer status flag register 172 is carried out by the bus arbitration control section 171.

Hereinbelow is explained an operation of the congestion control in an example where the termination node N1 transmits a frame to the termination node N4 in a computer system illustrated in FIG. 9.

When the cell producing section 140 of the fibre channel port section 100 corresponding to the termination node N1 checks a status of the output buffer 130 to which a frame or cell is to be transmitted, namely the output buffer 130 of the fibre channel port section 103 corresponding to the termination node N4, the cell producing section 140 first drives the requirement for buffer requirement control b01 to thereby notify the bus arbitration control section 171.

The bus arbitration control section 171 arbitrates the requirements for buffer requirement control b01 to b04 and the requirements for buffer release control b05 to b08 in accordance with a predetermined algorithm. As a result, if the cell producing section 140 which transmitted the requirement for buffer requirement control b01 obtains an allowance for using the output buffer status flag register 172, the bus arbitration control section 171 notifies an allowance bill for using a bus of the requester, namely the cell producing section 140.

The requestor or cell producing section 140 receiving a response from the bus arbitration control section 171 informs a binary digit "11" (see FIG. 21) of the address bus 181. The binary digit "11" is an address indicating the output buffer 130 of the fibre channel port section 103 which the cell producing section 140 is going to use. The cell producing section 140 concurrently informs a binary digit "1" of the data bus 182. Herein, the binary digit "1" is data indicating buffer requirement.

When the bus arbitration control section 171 checks the status of the address bus 181 and the data bus 182 to thereby know that requirement for the output buffer 130 of the fibre channel port section 103 is transmitted from the cell producing section 140, the bus arbitration control section 171 checks a value of a bit of an associated binary digit address "11" in the output buffer status flag register 172. If the checked bit is equal to "0" in a binary digit, the bus arbitration control section 171 replaces the binary digit "0" with a binary digit "1", and notifies the binary digit "0" of the requestor or cell producing section 140 through the data bus 182. On the other hand, if the checked bit is equal to "1" in a binary digit, the bus arbitration control section 171 notifies the binary digit "1", of the requester or cell producing section 140 through the data bus 182. Herein, a binary digit "0" in the output buffer status flag register 172 means that the output buffer is allowed to be used, and a binary digit "1" means that the output buffer is not allowed to be used.

In the arbitration algorithm for the requirements for buffer requirement control b01 to b04 and the requirements for buffer release control b05 to b08, the requirements for buffer release control take precedence of all the requirements for buffer requirement control. Hence, it is ensured that the requirements for buffer release control b05 to b08 are first processed when the requirements for buffer requirement control b01 to b04 and the requirements for buffer release control b05 to b08 are transmitted concurrently, resulting in reduction in occurrence rate of congestion.

In accordance with the above-mentioned congestion control, the output buffer is not allowed to be concurrently used for constructing a plurality of frames, which ensures that confusion in a cell is avoided, and that an excessive load is not exerted on ATM switch device 160. There is a possibility that a load unavoidable even by the above-mentioned congestion control may be exerted on ATM switch device with the result of occurrence of cell loss. However, it is possible to ensure reliability in data communication by means of a fibre channel by carrying out an inspection by virtue of cell numerals when a frame is constructed, to thereby detect improper frames and carry out error disposal.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-33209 filed on Jan. 31, 1997 including specification, claims, drawings and summary is incorporated herein by reference in its entirety.

What is claimed is:

1. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:

(a) fibre channel interface control means for communicating with a termination node or another fibre channel fabric to control a fibre channel in protocol;

(b) input data buffer means for temporarily storing a frame received from said termination node or said another fibre channel fabric;

(c) cell producing means for dividing the thus received frame into fixed length cells;

(d) cell switch means for interchanging data at the unit of a fixed length cell;

(e) frame constructing means for reconstructing an original frame of said fixed length cells transmitted from said cell switch means;

(f) output data buffer means for temporarily storing a frame transmitted from said frame constructing means; and (g) congestion controlling means for monitoring a load exerted on said cell switch means to thereby avoid congestion, wherein said congestion controlling means comprises (g1) flag register means having the bit number equal to the number of I/O ports: and (g2) a bus arbitrating and controlling means for receiving access requirements transmitted from said cell producing means and said frame constructing means to said flag register means, arbitrating said access requirements and transmitting arbitration results to a requester, controlling an address/data bus through which said cell producing means and said frame constructing means are communicated with said flag register means, in accordance with said arbitration results, to thereby control writing to and reading out of said flag register means, checking a value of a bit in said flag register means, and allowing use of said output data buffer means in accordance with said value of said checked bit.

2. The fibre channel fabric as set forth in claim 1, wherein said cell producing means comprises:
  (a) address header producing means for converting address data contained in a frame of a fibre channel into internal address data required for said cell switch means to carry out cell interchanges;
  (b) cell numeral producing means for producing sequence numerals for cells, which are necessary for detecting cell loss;
  (c) frame division control means for adding both an address header produced by said address header producing means and said cell sequence numeral produced by said cell numeral producing means into a fragment of a frame taken out of said input data buffer means to thereby produce a fixed length cell, and transferring the thus produced fixed length cell to said cell switch means; and
  (d) output buffer requiring means for cooperating with said congestion controlling means to manage operation status of said output data buffer means, and control operation timing of said frame division control means so that a load over a predetermined magnitude is not exerted on said cell switch means.

3. The fibre channel fabric as set forth in claim 2, wherein said address header producing means comprises:
  (a) address identifier storing means for storing an address identifier of an input frame; and
  (b) address converting means for receiving an output transmitted from said address identifier storing means, and transmitting an internal address identifier in a fabric to said cell switch means.

4. The fibre channel fabric as set forth in claim 3, wherein said address converting means is constituted of a static random access memory (SRAM).

5. The fibre channel fabric as set forth in claim 3, further comprising an address header register for storing data read out of said address converting means, said data making an address header.

6. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:
  (a) fibre channel interface control means for communicating with a termination node or another fibre channel fabric to control a fibre channel in protocol;
  (b) input data buffer means for temporarily storing a frame received from said termination node or said another fibre channel fabric;
  (c) cell producing means for dividing, the thus received frame into fixed length cells;
  (d) cell switch means for interchanging data at the unit of a fixed length cell;
  (e) frame constructing means for reconstructing an original frame of said fixed length cells transmitted from said cell switch means;
  (f) output data buffer means for temporarily storing a frame transmitted from said frame constructing means; and
  (g) congestion controlling means for monitoring a load exerted on said cell switch means to thereby avoid congestion;
  wherein said cell producing means comprises:
    (a) address header producing means for converting address data contained in a frame of a fibre channel into internal address data required for said cell switch means to carry out cell interchanges;
    (b) cell numeral producing means for producing sequence numerals for cells which are necessary for detecting cell loss;
    (c) frame division control means for adding both an address header produced by said address header producing means and said cell sequence numeral produced by said cell numeral producing means into a fragment of a frame taken out of said input data buffer means to thereby produce a fixed length cell and transferring the thus produced fixed length cell to said cell switch means; and
    (d) output buffer requiring means for cooperating with said congestion controlling means to manage operation status of said output data buffer means, and control operation timing of said frame division control means so that a load over a predetermined magnitude is not exerted on said cell switch means, and
  wherein said address header producing means comprises:
    (a) address identifier storing means for storing an address identifier of an input frame;
    (b) comparator means for comparing an output transmitted from said address identifier storing means with an address identifier transmitted to said fibre channel;
    (c) first address converting means for receiving a part of an output transmitted from said address identifier storing means, and transmitting an internal address identifier in a fabric to said cell switch means;
    (d) second address converting means for receiving another part of an output transmitted from said address identifier storing means, and transmitting an internal address identifier in a fabric to said cell switch means; and
    (e) selector means for selecting and transmitting one of outputs transmitted from said first and second address converting means in accordance with a result of comparison carried out by said comparator means.

7. The fibre channel fabric as set forth in claim 6, wherein each of said first and second address converting means is constituted of a static random access memory (SRAM).

8. The fibre channel fabric as set forth in claim 6, further comprising an address header register for storing said one of outputs transmitted from said first and second address converting means.

9. The fibre channel fabric as set forth in claim 2, wherein said frame constructing means comprises:
  (a) cell header removing means for removing cell control data including an address header out of a cell transferred from said cell switch means to thereby extract a fragment of a frame of a fibre channel, and transmitting the thus extracted fragment to said output data buffer means; and
  (b) cell numeral monitoring means for detecting whether cell loss occurs by monitoring an order of cells received from said cell switch means by virtue of said cell sequence numeral contained in a cell.

10. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:

(a) fibre channel interface control means for communicating with a termination node or another fibre channel fabric to control a fibre channel in protocol;

(b) input data buffer means for temporarily storing a frame received from said termination node or said another fibre channel fabric;

(c) cell producing means for dividing the thus received frame into fixed length cells;

(d) cell switch means for interchanging data at the unit of a fixed length cell;

(e) frame constructing means for reconstructing an original frame of said fixed length cells transmitted from said cell switch means;

(f) output data buffer means for temporarily storing a frame transmitted from said frame constructing means; and congestion controlling means for monitoring a load exerted on said cell switch means to thereby avoid congestion;

wherein said cell producing means comprises:

(a) address header producing means for converting address data contained in a frame of a fibre channel into internal address data required for said cell switch means to carry out cell interchanges;

(b) cell numeral producing means for producing sequence numerals for cells, which are necessary for detecting cell loss;

(c) frame division control means for adding both an address header produced by said address header producing means and said cell sequence numeral produced by said cell numeral producing means into a fragment of a frame taken out of said input data buffer means to thereby produce a fixed length cell, and transferring the thus produced fixed length cell to said cell switch means; and (d) output buffer requiring means for cooperating with said congestion controlling means to manage operation status of said output data buffer means, and control operation timing of said frame division control means so that a load over a predetermined magnitude is not exerted on said cell switch means; and wherein said cell numeral producing means comprises:

(a) a port identifier register for retaining a port number of a fibre channel; and (b) a counter countable up to a predetermined number, said counter being initialized prior to frame division accomplished by said frame division control means.

11. The fibre channel fabric as set forth in claim 10, wherein said counter is incremented each time when a cell is transferred, and applies the thus obtained number to said cell as a cell numeral.

12. The fibre channel fabric as set forth in claim 1, wherein said frame constructing means comprises:

(a) cell header removing means for removing cell control data including an address header out of a cell transferred from said cell switch means to thereby extract a fragment of a frame of a fibre channel, and transmitting the thus extracted fragment to said output data buffer means; and (b) cell numeral monitoring means for detecting whether cell loss occurs by monitoring an order of cells received from said cell switch means.

13. The fibre channel fabric as set forth in claim 1, wherein said input data buffer means is designed to have a function of absorbing a difference between a communication rate of a fibre channel and a cell interchange rate in said cell switch means.

14. The fibre channel fabric as set forth in claim 1, wherein said frame constructing means, when receiving a final cell constituting a frame, extracts data necessary for a fiber channel based on information contained in control data of said final cell.

15. The fibre channel fabric as set forth in claim 1, wherein said output data buffer means is designed to have a function of absorbing a difference between a communication rate of a fibre channel and a cell interchange rate in said cell switch means.

16. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:

(a) fibre channel interface controller for communicating with a termination node or another fibre channel fabric to control a fibre channel in protocol;

(b) input data buffer for temporarily storing a frame received from said termination node or said another fibre channel fabric;

(c) cell producer for dividing the thus received frame into fixed length cells;

(d) cell switch for interchanging data at the unit of a fixed length cell;

(e) frame constructor for reconstructing an original frame of said fixed length cells transmitted from said cell switch;

(f) output data buffer for temporarily storing a frame transmitted from said frame constructor; and (g) congestion controller for monitoring a load exerted on said cell switch to thereby avoid congestion, wherein said congestion controller comprises (g1) flag register having the bit number equal to the number of I/O ports; and (g2) a bus arbitrating and controlling device for receiving access requirements transmitted from said cell producer and said frame constructor to said flag register, arbitrating said access requirements and transmitting arbitration results to a requestor, controlling an address/data bus through which said cell producer and said frame constructor are communicated with said flag register, in accordance with said arbitration results, to thereby control writing to and reading out of said flag register, checking a value of a bit in said flag register, and allowing use of said output data buffer in accordance with said value of said checked bit.

17. The fibre channel fabric as set forth in claim 16, wherein said cell producer comprises:

(a) address header producer for converting address data contained in a frame of a fibre channel into internal address data required for said cell switch to carry out cell interchanges;

(b) cell numeral producer for producing sequence numerals for cells, which are necessary for detecting cell loss;

(c) frame division controller for adding both an address header produced by said address header producer and said cell sequence numeral produced by said cell numeral producer into a fragment of a frame taken out of said input data buffer to thereby produce a fixed length cell, and transferring the thus produced fixed length cell to said cell switch; and (d) output buffer requiring device for cooperating with said congestion controller to manage operation status of said output data buffer, and control operation timing of said frame division controller so that a load over a predetermined magnitude is not exerted on said cell switch.

18. The fibre channel fabric as set forth in claim 17, wherein said address header producer comprises:

(a) address identifier storing device for storing an address identifier of an input frame; and (b) address converter for receiving an output transmitted from said address identifier storing device, and transmitting an internal address identifier in a fabric to said cell switch.

19. The fibre channel fabric as set forth in claim 18, wherein said address converter is constituted of a static random access memory (SRAM).

20. The fibre channel fabric as set forth in claim 18, further comprising an address header register for storing data read out of said address converter, said data making an address header.

21. The fibre channel fabric as set forth in claim 17, wherein said frame constructor comprises:

(a) cell header remover for removing cell control data including an address header out of a cell transferred from said cell switch to thereby extract a fragment of a frame of a fibre channel, and transmitting the thus extracted fragment to said output data buffer; and (b) cell numeral monitor for detecting whether cell loss occurs by monitoring an order of cells received from said cell switch by virtue of said cell sequence numeral contained in a cell.

22. The fibre channel fabric as set forth in claim 16, wherein said frame constructor comprises:

(a) cell header remover for removing cell control data including an address header out of a cell transferred from said cell switch to thereby extract a fragment of a frame of a fibre channel, and transmitting the thus extracted fragment to said output data buffer; and (b) cell numeral monitor for detecting whether cell loss occurs by monitoring an order of cells received from said cell switch.

23. The fibre channel fabric as set forth in claim 16, wherein said input data buffer is designed to have a function of absorbing a difference between a communication rate of a fibre channel and a cell interchange rate in said cell switch.

24. The fibre channel fabric as set forth in claim 16, wherein said frame constructor, when receiving a final cell constituting a frame, extracts data necessary for a fibre channel frame based on information contained in control data of said final cell.

25. The fibre channel fabric as set forth in claim 16, wherein said output data buffer is designed to have a function of absorbing a difference between a communication rate of a fibre channel and a cell interchange rate in said cell switch.

26. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:

(a) fibre channel interface controller for communicating with a termination node or another fibre channel fabric to control a fibre channel in protocol;

(b) input data buffer for temporarily storing a frame received from said termination node or said another fibre channel fabric;

(c) cell producer for dividing the thus received frame into fixed length cells;

(d) cell switch for interchanging data at the unit of a fixed length cell;

(e) frame constructor for reconstructing an original frame of said fixed length cells transmitted from said cell switch;

(f) output data buffer for temporarily storing a frame transmitted from said frame constructor; and (g) congestion controller for monitoring a load exerted on said cell switch to thereby avoid congestion;

wherein said cell producer comprises:

(a) address header producer for converting address data contained in a frame of a fibre channel into internal address data required for said cell switch to carry out cell interchanges;

(b) cell numeral producer for producing sequence numerals for cells, which are necessary for detecting cell loss;

(c) frame division controller for adding both an address header produced by said address header producer and said cell sequence numeral produced by said cell numeral producer into a fragment of a frame taken out of said input data buffer to thereby produce a fixed length cell, and transferring the thus produced fixed length cell to said cell switch; and (d) output buffer requiring device for cooperating with said congestion controller to manage operation status of said output data buffer, and control operation timing of said frame division controller so that a load over a predetermined magnitude is not exerted on said cell switch; and wherein said address header producer comprises:

(a) address identifier storing device for storing an address identifier of an input frame;

(b) comparator for comparing an output transmitted from said address identifier storing device with an address identifier transmitted to said fibre channel;

(c) first address converter for receiving a part of an output transmitted from said address identifier storing device, and transmitting an internal address identifier in a fabric to said cell switch;

(d) second address converter for receiving another part of an output transmitted from said address identifier storing device, and transmitting an internal address identifier in a fabric to said cell switch; and (e) selector for selecting and transmitting one of outputs transmitted from said first and second address converter in accordance with a result of comparison carried out by said comparator.

27. The fibre channel fabric as set forth in claim 26, wherein each of said first and second address converter is constituted of a static random access memory (SRAM).

28. The fibre channel fabric as set forth in claim 26, further comprising an address header register for storing said one of outputs transmitted from said first and second address converter.

29. A fibre channel fabric for interchanging a frame by dividing a connectionless, variable length frame into fixed length cells without carrying out calling setup and/or releasing command between termination nodes, to thereby interchange cells, and further by reconstructing the thus interchanged cells into an original frame, said fibre channel fabric comprising:

(a) fibre channel interface controller for communicating with a termination node or another fibre channel fabric to control a fibre channel in protocol;

(b) input data buffer for temporarily storing a frame received from said termination node or said another fibre channel fabric;

(c) cell producer for dividing the thus received frame into fixed length cells;

(d) cell switch for interchanging data al the unit of a fixed length cell;

(e) frame constructor for reconstructing an original frame of said fixed length cells transmitted from said cell switch;

(f) output data buffer for temporarily storing a frame transmitted from said frame constructor; and (g) congestion controller for monitoring a load exerted on said cell switch to thereby avoid congestion;

wherein said cell producer comprises:

(a) address header producer for converting address data contained in a frame of a fibre channel into internal address data required for said cell switch to carry out cell interchanges;

(b) cell numeral producer for producing sequence numerals for cells, which are necessary for detecting cell loss;

(c) frame division controller for adding both an address header produced by said address header producer and said cell sequence numeral produced by said cell numeral producer into a fragment of a frame taken out of said input data buffer to thereby produce a fixed length cell, and transferring the thus produced fixed length cell to said cell switch; and (d) output buffer requiring device for cooperating with said congestion controller to manage operation status of said output data buffer, and control operation timing of said frame division controller so that a load over a predetermined magnitude is not exerted on said cell switch; and wherein said cell numeral producer comprises:

(a) a port identifier register for retaining a port number of a fibre channel; and (b) a counter countable up to a predetermined number, said counter being initialized prior to frame division accomplished by said frame division controller.

30. The fibre channel fabric as set forth in claim 29, wherein said counter is incremented each time when a cell is transferred, and applies the thus obtained number to said cell as a cell numeral.

* * * * *